US 11,497,035 B2

(12) United States Patent
Lin et al.

(10) Patent No.: US 11,497,035 B2
(45) Date of Patent: *Nov. 8, 2022

(54) METHODS AND SYSTEMS FOR PERFORMANCE ENHANCEMENT OF DOWNLINK SHARED CHANNELS

(71) Applicant: TELEFONAKTIEBOLAGET LM ERICSSON (PUBL), Stockholm (SE)

(72) Inventors: Zhipeng Lin, Nanjing (CN); Jingya Li, Gothenburg (SE); Robert Baldemair, Solna (SE); Yufei Blankenship, Kildeer, IL (US); Jung-Fu Cheng, Fremont, CA (US); Xingqin Lin, Santa Clara, CA (US); Ajit Nimbalker, Fremont, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/460,099

(22) Filed: Aug. 27, 2021

(65) Prior Publication Data

US 2021/0400683 A1  Dec. 23, 2021

Related U.S. Application Data

(63) Continuation of application No. 17/024,982, filed on Sep. 18, 2020, which is a continuation of application (Continued)

(30) Foreign Application Priority Data

Apr. 4, 2018 (CN) ................ PCT/CN2018/081994

(51) Int. Cl.
    *H04W 72/12* (2009.01)

(52) U.S. Cl.
    CPC ............................ *H04W 72/1205* (2013.01)

(58) Field of Classification Search
    CPC .... H04L 1/00; H04L 5/0053; H04W 72/1205; H04W 72/121; H04W 72/1289; H04W 72/1294; H04W 72/14; H04W 76/11
    See application file for complete search history.

(56) References Cited

U.S. PATENT DOCUMENTS

| 2010/0195614 A1 | 8/2010 | Nimbalker et al. |
| 2015/0043396 A1* | 2/2015 | Ekpenyong ........... H04L 5/0092 370/280 |

(Continued)

FOREIGN PATENT DOCUMENTS

| CN | 105557050 A | 5/2016 |
| CN | 107534535 A | 1/2018 |

(Continued)

OTHER PUBLICATIONS

Huawei et al., "Discussion and text proposal on TBS determination", R1-1801380, 3GPP TSG RAN WG1 Meeting #92, Athens, Greece, Feb. 26-Mar. 2, 2018. (Year: 2018).*

(Continued)

*Primary Examiner* — Khoa Huynh

(57) ABSTRACT

The present disclosure described systems and methods for providing OTT services to a UE. An exemplary OTT-providing host computer includes a transceiver, a processor, and memory collective configured to provide the OTT service by initiating transmission of user data to the UE. To transmit the user data from the host computer to the wireless device, a network node sends a first control message for assigning a PDSCH, the first control message comprising a first MCS indication as described. The network node sends to the wireless device a second control message for assigning a PDSCH, the second control message comprising a (Continued)

second MCS indication as described. The network node transmits the user data thereafter.

16 Claims, 10 Drawing Sheets

Related U.S. Application Data

No. 16/156,504, filed on Oct. 10, 2018, now Pat. No. 10,856,308.

(56) References Cited

U.S. PATENT DOCUMENTS

| | | | |
|---|---|---|---|
| 2017/0311294 | A1 | 10/2017 | Kim et al. |
| 2018/0279274 | A1 | 9/2018 | Sun et al. |
| 2019/0109676 | A1 | 4/2019 | Zhang et al. |
| 2019/0190644 | A1* | 6/2019 | Ugurlu ............... H04W 72/042 |
| 2019/0306876 | A1* | 10/2019 | Golitschek Edler von Elbwart ... H04L 1/0031 |
| 2020/0022218 | A1* | 1/2020 | Chang ................. H04W 16/26 |
| 2021/0135926 | A1* | 5/2021 | Siomina ............. H04L 41/0654 |
| 2021/0211232 | A1* | 7/2021 | Hwang ..................... H04L 5/00 |

FOREIGN PATENT DOCUMENTS

| | | |
|---|---|---|
| WO | 2011000441 A1 | 1/2011 |
| WO | 2018031623 A1 | 2/2018 |

OTHER PUBLICATIONS

3GPP, "3rd Generation Partnership Project; Technical Specification Group Radio Access Network; NR; Physical layer procedures for data (Release 15)", 3GPP TS 38.214 V15.2.0, Jun. 2018.

Ericsson, "CQI and MCS tables for URLLC", 3GPP TSG RAN WG1 #92, R1-1801563, Feb. 17, 2018, Athens, Greece.

Ericsson, "Summary of offline discussion on 7.3.3.1 (TB size, update of R1-1719035)", TSG-RAN WG1 #90bis, R1-1719144, Oct. 9-13, 2017, Prague, Czech Republic.

Huawei et al., "Discussion and text proposal on TBS determination", 3GPP TSG RAN WG1 #92, R1-1801380, Feb. 16, 2018, Athens, Greece.

LG Electronics, "Discussion on resource allocation and TBS determination", 3GPP TSG RAN WG1 #91, R1-1719929, Nov. 18, 2017, Reno, USA.

LG Electronics, "PDSCH related techniques for LTE URLLC", 3GPP TSG RAN WG1 #92, R1-1802181, Feb. 16, 2018, Athens, Greece.

Mediatek Inc., "MCS and CQI Tables design for URLLC", 3GPP TSG RAN WG1 #92, R1-1801676, Feb. 17, 2018, Athens, Greece.

Vivo, "Remaining issues on CQI and MCS", 3GPP TSG RAN WG1 Meeting #92, R1-1801522, Feb. 26- Mar. 2, 2018, Athens, Greece.

Zte et al., "On TBS determination procedure", 3GPP TSG RAN WG1 Meeting #92, R1-1802067, Feb. 26-Mar. 2, 2018, Athens, Greece.

* cited by examiner

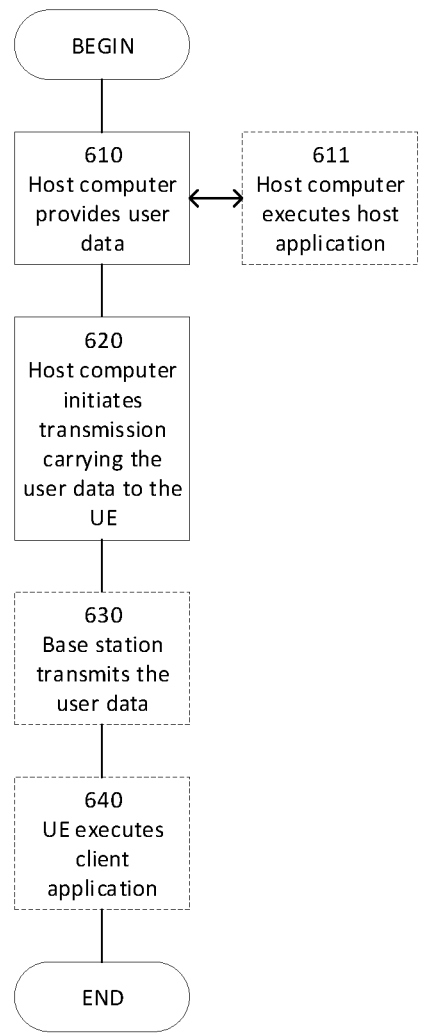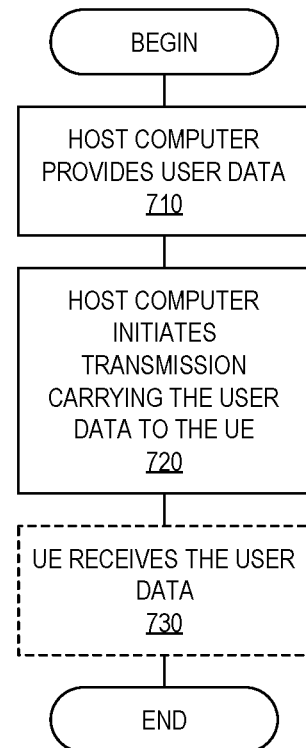
FIG. 6
FIG. 7

METHODS AND SYSTEMS FOR PERFORMANCE ENHANCEMENT OF DOWNLINK SHARED CHANNELS

RELATED APPLICATIONS

This application is a continuation of U.S. patent application Ser. No. 17/024,982 filed on Sep. 18, 2020, which is a continuation of U.S. patent application Ser. No. 16/156,504 filed on Oct. 10, 2018, granted as U.S. Pat. No. 10,856,308, on Dec. 1, 2020, which claims priority to International Patent Application No. PCT/IB2018/057271 filed on Sep. 20, 2018, and entitled "Methods and Systems for Performance Enhancement of Downlink Shared Channels" and to International Patent Application Serial No. PCT/CN2018/081994 filed on Apr. 4, 2018, all of which are hereby incorporated by reference in their entirety.

TECHNICAL FIELD

The present disclosure relates, in general, to wireless communications and, more particularly, to enhancing the performance of downlink shared channels in wireless communication networks.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Resource Blocks

The Third Generation Partnership Project 3GPP is the process of defining technical specifications for New Radio (NR) (e.g., 5G). In release 15 (Rel-15) NR, a user equipment (UE) can be configured with up to four carrier bandwidth parts (BWPs) in the downlink with a single downlink carrier bandwidth part being active at a given time. A UE can be configured with up to four carrier bandwidth parts in the uplink with a single uplink carrier bandwidth part being active at a given time. If a UE is configured with a supplementary uplink, the UE can additionally be configured with up to four carrier bandwidth parts in the supplementary uplink with a single supplementary uplink carrier bandwidth part being active at a given time.

For a carrier bandwidth part with a given numerology $\mu_i$, a contiguous set of physical resource blocks (PRBs) are defined and numbered from 0 to $N_{BWP,i}^{size}-1$, where i is the index of the carrier bandwidth part. A resource block (RB) is defined as 12 consecutive subcarriers in the frequency domain.

Numerologies

Multiple orthogonal frequency-division multiplexing (OFDM) numerologies, $\mu$, are supported in NR as given by Table 1, where the subcarrier spacing, $\Delta f$, and the cyclic prefix for a carrier bandwidth part are configured by different higher layer parameters for downlink (DL) and uplink (UL), respectively.

TABLE 1

Supported transmission numerologies.

| $\mu$ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Physical Channels

A downlink physical channel corresponds to a set of resource elements carrying information originating from higher layers. The following downlink physical channels are defined:
  Physical Downlink Shared Channel, PDSCH
  Physical Broadcast Channel, PBCH
  Physical Downlink Control Channel, PDCCH:

PDSCH is the main physical channel used for unicast downlink data transmission, but also for transmission of RAR (random access response), certain system information blocks, and paging information. PBCH carries the basic system information, required by the UE to access the network. PDCCH is used for transmitting downlink control information (DCI), mainly scheduling decisions, required for reception of PDSCH, and for uplink scheduling grants enabling transmission on PUSCH.

An uplink physical channel corresponds to a set of resource elements carrying information originating from higher layers. The following uplink physical channels are defined:
  Physical Uplink Shared Channel, PUSCH:
  Physical Uplink Control Channel, PUCCH
  Physical Random Access Channel, PRACH PUSCH is the uplink counterpart to the PDSCH. PUCCH is used by UEs to transmit uplink control information, including HARQ acknowledgements, channel state information reports, etc. PRACH is used for random access preamble transmission.

Frequency Resource Allocation for PUSCH and PDSCH

In general, a UE shall determine the RB assignment in frequency domain for PUSCH or PDSCH using the resource allocation field in the detected DCI carried in PDCCH. For PUSCH carrying msg3 in a random-access procedure, the frequency domain resource assignment is signaled by using the UL grant contained in RAR.

In NR, two frequency resource allocation schemes, type 0 and type 1, are supported for PUSCH and PDSCH. Which type to use for a PUSCH/PDSCH transmission is either defined by a radio resource control (RRC) configured parameter or indicated directly in the corresponding DCI or UL grant in RAR (for which type 1 is used).

The RB indexing for uplink/downlink type 0 and type 1 resource allocation is determined within the UE's active carrier bandwidth part. Upon detecting the PDCCH intended for the UE, the UE shall first determine the uplink/downlink carrier bandwidth part and then the resource allocation within the carrier bandwidth part. The UL BWP for PUSCH carrying msg3 is configured by higher layer parameters.

Cell Search and Initial Access Related Channels and Signals

For cell search and initial access, these channels are included: Synchronization Signal and PBCH block (SS/PBCH block, or "SSB" in shorter format), PDSCH carrying Remaining Minimum System Information (RMSI)/RAR/MSG4 scheduled by PDCCH channels carrying DCI, PRACH channels and PUSCH channel carrying MSG3 in a random access procedure.

The SSB comprises synchronization signals and PBCH. The synchronization signals may comprise, for example, Primary Synchronization Signal (PSS), Secondary Synchronization Signal (SSS), and PBCH Demodulation Reference Signal (DMRS). SSB may have 15 kHz, 30 kHz, 120 kHz or 240 kHz SCS depending on the frequency range.

There currently exist certain challenge(s). For example, PDSCH may have certain challenges with respect to performance A performance comparison among the signals and channels have been done as below to find the weakest channel in NR.

The signals and channels considered are SS/PBCH block, PRACH, PDCCH, PDSCH.

1. For SS/PBCH block, the cell-id miss detection rate, SSB time index detection rate and PBCH block error rate (BLER) performance have been investigated when 15 kHz SCS, 1TX/2RX, low band, with different UE speed and different TDL-A channel delay spreads.

In general, the PBCH performance is not worse than −4.3 dB at 10% BLER and the cell-id/SSB index detection performance is 2 dB to 3 dB better than PBCH BLER. Considering the SSB is repeating with SSB periodicity, the PBCH BLER can be improved around 2 dB to 3 dB when 2 consecutive SSBs are combined. So, the overall performance gain of SS/PBCH block can reach −6 dB at 10% BLER.

2. For PDSCH, when the number of PRBs is small (e g for RAR, 3 PRBs will be allocated based on current modulation and coding scheme (MCS) tables and payload size of RAR), the performance from the simulation with precoder cycling TX diversity (the TX diversity used in NR) is just around −2.3 dB at 10% BLER. This might be not an issue for RMSI since RMSI may also repeat with one RMSI transmission time interval (TTI) (160 ms) depending how many RMSIs are associated with SSBs within this TTI. But for RAR, no repetition of PDSCH is supported.

3. For PRACH, performance has also been investigated with similar simulation assumptions as SS/PBCH block, and the performance is quite good, i.e. −6 dB can be reached at the target miss detection rate, compared the SS/PBCH block based on similar simulations.

4. For PDCCHs, the target BLER is 1%, at which a SNR of lower than −6 dB can be reached based on similar simulations as SS/PBCH since the aggregation level in NR now can be 16.

So, in general, broadcasting PDSCH is the weakest channel based on the above comparisons, especially if a small payload size and a small number of PRBs are allocated.

Thus, some methods are required to improve the performance of broadcasting PDSCH Certain aspects of the present disclosure and their embodiments may provide solutions to these or other challenges. For example, certain embodiments propose solutions for improving the receiver performance of broadcast PDSCH channels limiting the overall performance of NR. Certain embodiments combine PDSCH performance.

There are, proposed herein, various embodiments which address one or more of the issues disclosed herein.

Certain embodiments may provide one or more of the following technical advantage(s). For example, certain embodiments improve the receiving performance of the PDSCH.

SUMMARY

According to certain embodiments, a method performed by a network node is disclosed. The method comprises indicating in a control message at least a Modulation and Coding Scheme (MCS) and a scaling factor for a downlink shared channel. The scaling factor indicating a value less than 1. The method further comprises sending the control message to a User Equipment (UE). The control message enabling determination of a Transport Block Size (TBS) for a shared downlink channel.

According to certain embodiments, a network node comprises memory and processing circuitry. The memory is operable to store instructions. The processing circuitry operable to execute the instructions. The network node is operable to indicate in a control message at least a Modulation and Coding Scheme (MCS) and a scaling factor for a downlink shared channel. The scaling factor indicating a value less than 1. The network node is further operable to send the control message to a User Equipment (UE), the control message enabling determination of a Transport Block Size (TBS) for a shared downlink channel.

According to certain embodiments, a computer program product comprises a non-transitory computer readable medium storing computer readable program code. The computer readable program code comprises program code for indicating in a control message at least a Modulation and Coding Scheme (MCS) and a scaling factor for a downlink shared channel. The scaling factor indicating a value less than 1. The computer readable program code further comprises program code for sending the control message to a User Equipment (UE). The control message enabling determination of a Transport Block Size (TBS) for a shared downlink channel.

The above-described method, network node, and/or computer program code may include various other features, including any one or more of the following:

In certain embodiments, the control message enables the UE to determine an intermediate number of information bits based at least on the MCS and scaling factor, and wherein the intermediate number of bits enables the UE to determine the TBS.

In certain embodiments, the scaling factor is one of ½ and ¼.

In certain embodiments, the control message comprises a bit indicating to use a first scaling factor when the bit is set to a first value and to use a second scaling factor when the bit is set to a second value.

In certain embodiments, the control message comprises at least one bit indicating to use ½ as the scaling factor when a first bit of the at least one bit is set to 0 and to use ¼ as the second scaling factor when the first bit is not set to 0.

In certain embodiments, the control message is sent via a physical downlink control channel (PDCCH).

In certain embodiments, the scaling factor is indicated in the control message via PDCCH, and the scaling factor comprises a value of ½ or ¼.

In certain embodiments, the shared channel is a physical downlink shared channel (PDSCH). In some embodiments, the PDSCH is a broadcast channel.

In certain embodiments, the control message is carried on a PDCCH with a cyclic redundancy check (CRC) scrambled by a radio network temporary identifier (RNTI), the RNTI comprising a system information-RNTI (SI-RNTI), a random access-RNTI (RA-RNTI), or a paging-RNTI (P-RNTI).

In certain embodiments, method/network node/computer program code enabling the UE to determine the TB S further enables the UE to decode a transport block of the shared channel.

In certain embodiments, the control message further indicates a time or frequency domain repetition.

In certain embodiments, the MCS indicated in the control message comprises a lower spectral efficiency than a normal MCS. In some embodiments, the normal MCS corresponds to an MCS according to a third generation partnership project (3GPP) technical specification (TS) 38.214 version 15.2.0 or earlier.

In certain embodiments, method/network node/computer program code further comprises determining the MCS to indicate in the control message based on a table that is defined for an enhanced Mobile Broadband (eMBB) PDSCH.

In certain embodiments, method/network node/computer program code further comprises determining the MCS to indicate in the control message based on a table or table entries that are defined specifically for the PDSCH.

In certain embodiments, method/network node/computer program code further comprises allocating a physical resource block (PRB) based at least in part on the TBS.

According to certain embodiments, a method performed by a wireless device is disclosed. The method comprises receiving a control message. The control message indicating at least a Modulation and Coding Scheme (MCS) and a scaling factor for a downlink shared channel. The scaling factor indicates a value less than 1. The method further comprises determining a transport block size (TB S) based on the MCS and the scaling factor indicated in the control message.

According to certain embodiments, a wireless device comprises memory and processing circuitry. The memory is operable to store instructions. The processing circuitry is operable to execute the instructions. The wireless device is operable to receive a control message. The control message indicating at least a Modulation and Coding Scheme (MCS) and a scaling factor for a downlink shared channel. The scaling factor indicates a value less than 1. The wireless device is further operable to determine a transport block size (TBS) based on the MCS and the scaling factor indicated in the control message.

According to certain embodiment, a computer program product comprises a non-transitory computer readable medium storing computer readable program code. The computer readable program code comprises program code for receiving a control message. The control message indicating at least a Modulation and Coding Scheme (MCS) and a scaling factor for a downlink shared channel. The scaling factor indicates a value less than 1. The computer readable program code further comprises program code for determining a transport block size (TBS) based on the MCS and the scaling factor indicated in the control message.

The above-described method, wireless device, and/or computer program code may include various other features, including any one or more of the following:

In certain embodiments, the method/wireless device/computer program code determining the TBS based on the MCS and the scaling factor indicated in the control message comprises determining an intermediate number of information bits at least based on the MCS and the scaling factor.

In certain embodiments, the scaling factor is one of ½ and ¼.

In certain embodiments, the control message comprises at least one bit indicating to use a first scaling factor when a first bit of the at least one bit is set to a first value and to use a second scaling factor when the first bit is set to a second value.

In certain embodiments, the control message comprises at least one bit indicating to use ½ as the scaling factor when a first bit of the at least one bit is set to 0 and to use ¼ as the second scaling factor when the first bit is not set to 0.

In certain embodiments, the control message is sent via a physical downlink control channel (PDCCH).

In certain embodiments, the scaling factor is indicated in the control message via PDCCH, and the scaling factor comprises a value of ½ or ¼.

In certain embodiments, wherein the shared channel is a physical downlink shared channel (PDSCH). In some embodiments, the PDSCH is a broadcast channel.

In certain embodiments, the control message is carried on a PDCCH with a cyclic redundancy check (CRC) scrambled by a radio network temporary identifier (RNTI), the RNTI comprising a system information-RNTI (SI-RNTI), a random access-RNTI (RA-RNTI), or a paging-RNTI (P-RNTI).

In certain embodiments, the method/wireless device/computer program code further comprises decoding a transport block of the downlink shared channel based on the TBS determined based on the MCS and the scaling factor indicated in the control message.

In certain embodiments, the control message further indicates a time or frequency domain repetition.

In certain embodiments, the MCS indicated in the control message comprises a lower spectral efficiency than a normal MCS. In some embodiments, the normal MCS corresponds to an MCS according to a third generation partnership project (3GPP) technical specification (TS) 38.214 version 15.2.0 or earlier.

In certain embodiments, the control message indicates the MCS based on a table that is defined for an enhanced Mobile Broadband (eMBB) PDSCH.

In certain embodiments, the control message indicates the MCS based on a table or table entries that are defined specifically for the PDSCH.

In certain embodiments, the method/wireless device/computer program code further comprises obtaining (1530) a physical resource block (PRB) allocation based at least in part on the determined TBS.

Certain embodiments of the present disclosure may provide one or more technical advantages. For example, certain embodiments allow a wireless device to determine a transport block size based on a Modulation and Coding Scheme and scaling factor indicated in a control message from a network node. In this manner, the transport block size may be adjusted to enhance the performance of PDSCH. As another example, certain embodiments include determining an intermediate number of information bits at least based on the Modulation and Coding Scheme and the scaling factor. Accordingly, the transport block size may be adjusted by adjusting intermediate values that factor into the determination of the transport block size. As yet another example, certain embodiments include indicating an MCS in the control message that has a lower spectral efficiency than a normal MCS. For example, the indicated MCS may be based on a table defined for an enhanced Mobile Broadband PDSCH or on a table or table entries that are defined specifically for the PDSCH. By providing a lower spectral efficiency MCS, the transport block size may be adjusted to enhance performance of the PDSCH. Other advantages may be readily apparent to one having skill in the art. Certain embodiments may have non, some, or all of the above-recited advantages.

BRIEF DESCRIPTION OF THE DRAWINGS

For a more complete understanding of the disclosed embodiments and their features and advantages, reference is now made to the following description, taking in conjunction with the accompanying drawings, in which:

FIG. 6 is a flowchart illustrating an example method implemented in a communication system, in accordance certain embodiments;

FIG. 7 is a flowchart illustrating a second example method implemented in a communication system, in accordance with certain embodiments;

DETAILED DESCRIPTION

Figure 1:
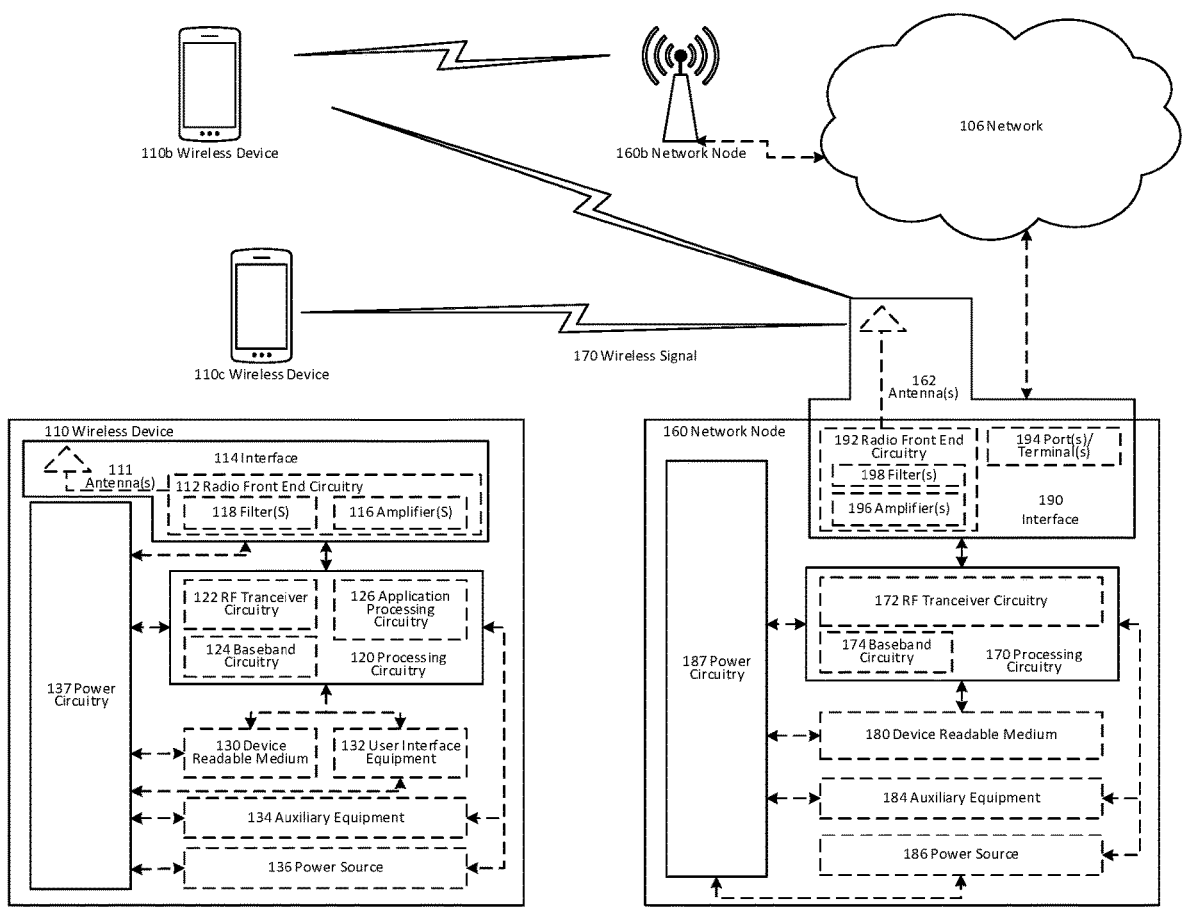
FIG. 1 illustrates an example wireless network, in accordance with certain embodiments.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Certain embodiments of the present disclosure may be based on section 5.1.3 of 3GPP TS 38.214 V15.0.0, which is provided below:

5.1.3 Modulation Order, Target Code Rate, and Transport Block Size Determination To determine the modulation order, target code rate, and transport block size(s) in the physical downlink shared channel, the UE shall first
    read the 5-bit "modulation and coding scheme" field ($I_{MCS}$) in the DCI to determine the modulation order ($Q_m$) and target code rate (R) based on the procedure defined in Subclause 5.1.3.1.
and second
    the UE shall use the number of layers (u), the total number of allocated PRBs before rate matching ($n_{PRB}$) to determine to the transport block size based on the procedure defined in Subclause 5.1.3.2.

The UE may skip decoding a transport block in an initial transmission if the effective channel code rate is higher than 0.95, where the effective channel code rate is defined as the number of downlink information bits (including CRC bits) divided by the number of physical channel bits on PDSCH. If the UE skips decoding, the physical layer indicates to higher layer that the transport block is not successfully decoded.

5.1.3.1 Modulation Order and Target Code Rate Determination

For the PDSCH assigned by a PDCCH with DCI format 1_0/1_1 with CRC scrambled by C-RNTI,
if the higher layer parameter MCS-Table-PDSCH is not set to '256QAM',
    the UE shall use Imo' and Table 5.1.3.1-1 to determine the modulation order ($Q_m$) and Target code rate (R) used in the physical downlink shared channel.
else
    the UE shall use Imo' and Table 5.1.3.1-2 to determine the modulation order ($Q_m$) and Target code rate (R) used in the physical downlink shared channel.
end

TABLE 5.1.3.1-1

| MCS index table 1 for PDSCH | | | |
| --- | --- | --- | --- |
| MCS Index $I_{MCS}$ | Modulation Order $Q_m$ | Target code Rate × [1024] R | Spectral efficiency |
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |

TABLE 5.1.3.1-1-continued

MCS index table 1 for PDSCH

| MCS Index $I_{MCS}$ | Modulation Order $Q_m$ | Target code Rate × [1024] R | Spectral efficiency |
|---|---|---|---|
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 |  | reserved |
| 30 | 4 |  | reserved |
| 31 | 6 |  | reserved |

TABLE 5.1.3.1-2

MCS index table 2 for PDSCH

| MCS Index $I_{MCS}$ | Modulation Order $Q_m$ | Target code Rate × [1024] R | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 |  | reserved |
| 29 | 4 |  | reserved |
| 30 | 6 |  | reserved |
| 31 | 8 |  | reserved |

5.1.3.2 Transport Block Size Determination

For the PDSCH assigned by a PDCCH with DCI format 1_0/1_1 with CRC scrambled by C-RNTI, if the higher layer parameter MCS-Table-PDSCH is set to '256QAM' is configured and $0 \le I_{MCS} \le 27$, or the higher layer parameter MCS-Table-PDSCH is not set to '256QAM' configured and $0 \le I_{MCS} \le 28$, the UE shall first determine the TBS as specified below:

1) The UE shall first determine the number of REs ($N_{RE}$) within the slot.

A UE first determines the number of REs allocated for PDSCH within a PRB ($N'_{RE}$) by $N'_{RE} = N_{sc}^{RB} * N_{symb}^{sh} - N_{DMRS}^{PRB} - N_{oh}^{PRB}$, where $N_{sc}^{RB} = 12$ is the number of subcarriers in the frequency domain in a physical resource block, $N_{symb}^{sh}$ is the number of scheduled OFDM symbols in a slot, $N_{DMRS}^{PRB}$ is the number of REs for DM-RS per PRB in the scheduled duration including the overhead of the DM-RS CDM groups indicated by DCI format 1_0/1_1, and $N_{oh}^{PRB}$ is the overhead configured by higher layer parameter Xoh-PDSCH. If the Xoh-PDSCH is not configured (a value from 0, 6, 12, or 18), the Xoh-PDSCH is set to 0.

A UE determines the quantized number of REs allocated for PDSCH within a PRB ($\overline{N}'_{RE}$ by Table 5.1.3.2-1.

TABLE 5.1.3.2-1

Quantized number of REs allocated for PDSCH within a PRB

| $N'_{RE}$ | $\overline{N}'_{RE}$ |
|---|---|
| $N'_{RE} \le 9$ | 6 |
| $9 < N'_{RE} \le 15$ | 12 |
| $15 < N'_{RE} \le 30$ | 18 |
| $30 < N'_{RE} \le 57$ | 42 |
| $57 < N'_{RE} \le 90$ | 72 |
| $90 < N'_{RE} \le 126$ | 108 |
| $126 < N'_{RE} \le 150$ | 144 |
| $150 < N'_{RE}$ | 156 |

A UE determines the total number of REs allocated for PDSCH ($N_{RE}$ by $N_{RE} = \overline{N}'_{RE} * n_{PRB}$, where $n_{PRB}$ is the total number of allocated PRBs for the UE.

2) Intermediate number of information bits ($N_{info}$) is obtained by $$N_{info} = N_{RE} * R * Q_m * \upsilon.$$

If $N_{info} \le 3824$
Use step 3 as the next step of the TBS determination
else
Use step 4 as the next step of the TBS determination
end 3) When $N_{info} \le 3824$, TBS is determined as follows quantized intermediate number of information bits $$N'_{info} = \max\left(24, 2^n * \left\lfloor \frac{N_{info}}{2^n} \right\rfloor\right),$$

where $n = \max(3, \lfloor \log_2(N_{info}) \rfloor - 6)$.

use Table 5.1.3.2-2 find the closest TBS that is not less than $N'_{info}$.

TABLE 5.1.3.2-2

TBS for $N_{info} \le 3824$

| Index | TBS |
|---|---|
| 1 | 24 |
| 2 | 32 |
| 3 | 40 |
| 4 | 48 |
| 5 | 56 |
| 6 | 64 |
| 7 | 72 |
| 8 | 80 |
| 9 | 88 |
| 10 | 96 |
| 11 | 104 |
| 12 | 112 |
| 13 | 120 |
| 14 | 128 |
| 15 | 136 |
| 16 | 144 |
| 17 | 152 |
| 18 | 160 |
| 19 | 168 |
| 20 | 176 |
| 21 | 184 |
| 22 | 192 |
| 23 | 208 |
| 24 | 224 |
| 25 | 240 |

TABLE 5.1.3.2-2-continued

TBS for $N_{info} \leq 3824$

| Index | TBS |
|---|---|
| 26 | 256 |
| 27 | 272 |
| 28 | 288 |
| 29 | 304 |
| 30 | 320 |
| 31 | 336 |
| 32 | 352 |
| 33 | 368 |
| 34 | 384 |
| 35 | 408 |
| 36 | 432 |
| 37 | 456 |
| 38 | 480 |
| 39 | 504 |
| 40 | 528 |
| 41 | 552 |
| 42 | 576 |
| 43 | 608 |
| 44 | 640 |
| 45 | 672 |
| 46 | 704 |
| 47 | 736 |
| 48 | 768 |
| 49 | 808 |
| 50 | 848 |
| 51 | 888 |
| 52 | 928 |
| 53 | 984 |
| 54 | 1032 |
| 55 | 1064 |
| 56 | 1128 |
| 57 | 1160 |
| 58 | 1192 |
| 59 | 1224 |
| 60 | 1256 |
| 61 | 1288 |
| 62 | 1320 |
| 63 | 1352 |
| 64 | 1416 |
| 65 | 1480 |
| 66 | 1544 |
| 67 | 1608 |
| 68 | 1672 |
| 69 | 1736 |
| 70 | 1800 |
| 71 | 1864 |
| 72 | 1928 |
| 73 | 2024 |
| 74 | 2088 |
| 75 | 2152 |
| 76 | 2216 |
| 77 | 2280 |
| 78 | 2408 |
| 79 | 2472 |
| 80 | 2536 |
| 81 | 2600 |
| 82 | 2664 |
| 83 | 2728 |
| 84 | 2792 |
| 85 | 2856 |
| 86 | 2976 |
| 87 | 3104 |
| 88 | 3240 |
| 89 | 3368 |
| 90 | 3496 |
| 91 | 3624 |
| 92 | 3752 |
| 93 | 3824 |

4) When $N_{info} > 3824$, TBS is determined as follows.

- quantized intermediate number of information bits $$N'_{info} = 2^n \times \mathrm{round}\left(\frac{N_{info} - 24}{2^n}\right), \text{ where } n = \lfloor \log_2(N_{info} - 24) \rfloor - 5$$

and ties in the round function are broken towards the next largest interger.
- if $R \leq 1/4$ $$TBS = 8 * C * \left\lceil \frac{N'_{info} + 24}{8 * C} \right\rceil - 24, \text{ where } C = \left\lceil \frac{N'_{info} + 24}{3816} \right\rceil$$

else
if $N_{info}' < 8424$ $$TBS = 8 * C * \left\lceil \frac{N'_{info} + 24}{8 * C} \right\rceil - 24 \text{ where } C = \left\lceil \frac{N'_{info} + 24}{8424} \right\rceil$$

else $$TBS = 8 * \left\lceil \frac{N'_{info} + 24}{8} \right\rceil - 24$$

end
end else if the higher layer parameter MCS-Table-PDSCH is set to '256QAM' is configured and $28 \leq I_{MCS} \leq 31$,
the TBS is assumed to be as determined from the DCI transported in the latest PDCCH for the same transport block using $0 \leq I_{MCS} \leq 27$. If there is no PDCCH for the same transport block using $0 \leq I_{MCS} \leq 27$, and if the initial PDSCH for the same transport block is semi-persistently scheduled, the TBS shall be determined from the most recent semi-persistent scheduling assignment PDCCH.
else
the TBS is assumed to be as determined from the DCI transported in the latest PDCCH for the same transport block using $0 \leq I_{MCS} \leq 28$. If there is no PDCCH for the same transport block using $0 \leq I_{MCS} \leq 28$, and if the initial PDSCH for the same transport block is semi-persistently scheduled, the TBS shall be determined from the most recent semi-persistent scheduling assignment PDCCH.

The NDI and HARQ process ID, as signalled on PDCCH, and the TBS, as determined above, shall be reported to higher layers.

As shown above, section 5.1.3 provides certain methods for calculating the TBS. Certain embodiments disclosed herein may be described or implemented as certain modifications and/or additions to section 5.1.3. For example, in the first set of embodiments described below, section 5.1.3 may be modified to change how the TBS is calculated to allow adjustment to provide a lower code rate, e.g., by providing a scaling factor and/or modifying one or more intermediary values. As another example, the second set of embodiments may modify section 5.1.3 to allow lower MCS values to be utilized to provide a lower code rate, e.g., by providing new entries in existing MCS tables or providing additional tables with lower MCS values. As yet another example, certain embodiments may modify section 5.1.3 to improve reliability by allowing repetition in time and/or frequency or modify section 5.1.3 to allow for the use of an inflated TBS when determining the PRB allocation. While certain embodiments may be described as modifications to certain sections of the above-recited standard, other embodiments need not be based on the standard.

First Set of Embodiments: Provide Lower Code Rate Via Adjustment to the TBS Determination Procedure The first set of embodiments provide methods for broadcasting PDSCHs with lower coding rate by adjusting the transport block size (TBS) determination procedure.

In some embodiments, a slightly different TBS determination procedure is specified for Broadcast PDSCH, using the unicast TBS determination procedure as a basis. That is, when PDSCH is assigned by a PDCCH with a cyclic redundancy check (CRC) scrambled by C-RNTI, TC-RNTI, CS-RNTI, the unicast TBS determination procedure applies. When PDSCH is assigned by a PDCCH with CRC scrambled by SI-RNTI, RA-RNTI, or P-RNTI, then the modified procedure applies. C-RNTI, TC-RNTI, and CS-RNTI refer to radio network temporary identifiers (RNTIs), in particular, cell-RNTI, temporary cell-RNTI, and configured scheduling-RNTI, respectively. SI-RNTI, RA-RNTI, and P-RNTI refer to system information-RNTI, random access-RNTI, and paging-RNTI, respectively.

Three methods are given below based on section 5.1.3 of 3GPP TS 38.214 V15.0.0.

Methods A-1. Use a scaling factor $\alpha$, $\alpha<1$, in intermediate variables of TBS determination procedure.

In one example, the number of resource elements allocated for PDSCH within a PRB $N'_{RE}$ is scaled. $N'_{RE} = \alpha (N_{sc}^{RB} \cdot N_{symb}^{sh} - N_{DMRS}^{PRB} - N_{oh}^{PRB})$.
 In another example, $n_{PRB}$ is scaled, where $n_{PRB}$ is the total number of allocated PRBs for the UE. Thus: $N_{RE} = \min(156, N'_{RE}) \times \alpha \times n_{PRB}$
 In yet another example, the intermediate number of information bits ($N_{info}$) is scaled, thus: $N_{info} = \alpha * N_{RE} * R * Q_m * \upsilon$.

As shown below in the second set of embodiments, one MCS bit may be saved since only quadrature phase-shift keying (QPSK) is relevant for broadcast PDSCH. This unused bit can be used to indicate two different $\alpha$ values. For example, if the unused bit=0, then $\alpha=1/2$; otherwise, $\alpha=1/4$. The $\alpha$ values provided above are examples, and other values could be used. For example, in some embodiments, more than one bit may be used to indicate the scaling factor. For example, if two bits are used, the following $\alpha$ values may be used: bits=11 $\alpha$=1, bits=1 $\alpha$=1/2, bits=10 $\alpha$=1/4, bits=00 $\alpha$=1/8. In some embodiments, different $\alpha$ values can also be associated with different RNTI values. In some embodiments, DCI bits that are reserved can be used to select an appropriate $\alpha$-value. Certain embodiments configure a UE with one or more $\alpha$-values (and in case of more than one value, use some bit(s) in DCI to select one of the multiple values).

Methods A-2. Use a Large Overhead Value in $N'_{RE}$ Calculation

Currently, $N_{oh}^{PRB}$ is the overhead configured by higher layer parameter Xoh-PDSCH. If the Xoh-PDSCH is not configured (a value from 0, 6, 12, or 18), the Xoh-PDSCH is set to 0.

For broadcast PDSCH, a large $N_{oh}^{PRB}$ value can be used to get a lower TBS, thus a lower code rate. In one example, Xoh-PDSCH is set to the highest value that's RRC configurable, i.e., Xoh-PDSCH is set to 18 if the PDSCH carries broadcast message. In another example, Xoh-PDSCH is set to a predefined value that's not in the set of values that can be RRC configured. For example, Xoh-PDSCH is predefined (configured) to one value selected from the set {24, 36, 48, 60, 72} for broadcast PDSCH.

As shown below in the second set of embodiments, one MCS bit may be saved since only QPSK is relevant for broadcast PDSCH. This unused bit can be used to indicate two different $N_{oh}^{PRB}$ values. For example, if the unused bit=0, then $N_{oh}^{PRB}=36$; otherwise, $N_{oh}^{PRB}=60$. Different $N_{oh}^{PRB}$ values can also be associated with different RNTI values. In some embodiments, DCI bits that are reserved can be used to select an appropriate $N_{oh}^{PRB}$ value.

Methods A-3: Nonlinear TBS Modification

In certain embodiments, the #of PRB used in TBS calculation is the #of allocated PRB modulo X.
  For example, consider X=5. For the RAR, we can allocate either 3 PRB, 8 PRB or 13 PRB, which would all give the same TBS.
 In some embodiments, this may provide advantages for broadcasting PDSCHs by choosing a suitable parameter X in the specs.
 Certain challenges may still exist with system information (SI) with the consideration of avoiding limiting the max SI TBS.

Additionally, a bit in the DCI (e.g., a bit of the MCS field, since broadcast PDSCH is limited to QPSK) or another field in the DCI may be used to select one out of multiple predefined/configured X values. As in other embodiments discussed above, these embodiments may also depend on the RNTI, e.g., in some embodiments this method is only applied for some broadcast RNTI, e.g. P-RNTI and RA-RNTI. The RNTI can also be used to select an appropriate X value.

Methods A-4: Enhanced TBS Determination

In certain embodiments, all the 28 spectral efficiencies as allowed in 64QAM MCS table are supportable for TBS determination for P/RA/SI, even though the Modulation scheme for the corresponding transport block is restricted to QPSK, i.e., the device utilizes the Qm corresponding to I_MCS for TBS determination, while the modulation order applied for the transport block is given by Qm'=min (Qm, 2).
 In addition, a flexible resource block allocation can support TBS reading via a non-linear PRB mapping. For example, for a #of allocated PRBs, the TBS is determined via the #of allocated PRBs modulo X.
 For example, if X=6=>1 PRB, 7 PRB, 13 PRB will use same TBS.

Second Set of Embodiments: Provide MCS Levels with Lower Spectral Efficiency The second set of embodiments provides methods for broadcasting PDSCHs with lower coding rate by providing MCS levels with lower spectral efficiency.

In certain embodiments, a different MCS Table may be used for Broadcast PDSCH. Two methods are given below based on section 5.1.3 of 3GPP TS 38.214 V15.0.1.

Method B-1. Use an MCS table that contains lower MCS entries that are currently defined for enhanced Mobile Broadband (eMBB) PDSCH.

Currently a new MCS table is expected to be defined for Rel-15 NR URLLC for reaching a BLER target lower than that of eMBB, for example, to reach BLER target=$10^{-5}$ instead of $10^{-1}$. The URLLC PDSCH MCS table is expected to contain MCS values lower than MCS0 of eMBB MCS table.

In certain embodiments, a method specifies that the broadcast PDSCH uses the MCS entries in the NR URLLC MCS table. Further, it can specify that broadcast PDSCH uses the MCS entries in the NR URLLC MCS table for the lower BLER target.

As an example, the following has been proposed for URLLC MCS table. It can be specified that broadcast PDSCH uses the MCS entries in the following NR URLLC MCS table for BLER target=$10^{-5}$.

Additionally, a bit in the DCI (e.g. a bit of the MCS filed, since broadcast PDSCH is limited to QPSK) or another field in the DCI can be used to select one out of multiple MCS tables. Some embodiments can also depend on the RNTI, e.g., in some embodiments this method is only applied for some broadcast RNTI, e.g. P-RNTI and RA-RNTI. The RNTI can also be used to select an appropriate MCS table.

| MCS Index $I_{MCS}$ for BLER = $10^{-3}$ | MCS Index $I_{MCS}$ for BLER = $10^{-5}$ | Modulation Order $Q_m$ | Code rate R × 1024 | Spectral efficiency |
|---|---|---|---|---|
| N/A | 0 | 2 | 32 | 0.0625 |
| N/A | 1 | 2 | 41 | 0.0801 |
| 0 | 2 | 2 | 50 | 0.0977 |
| 1 | 3 | 2 | 64 | 0.1250 |
| 2 | 4 | 2 | 78 | 0.1523 |
| 3 | 5 | 2 | 99 | 0.1934 |
| 4 | 6 | 2 | 120 | 0.2344 |
| 5 | 7 | 2 | 157 | 0.3066 |
| 6 | 8 | 2 | 193 | 0.3770 |
| 7 | 9 | 2 | 251 | 0.4902 |
| 8 | 10 | 2 | 308 | 0.6016 |
| 9 | 11 | 2 | 379 | 0.7402 |
| 10 | 12 | 2 | 449 | 0.8770 |
| 11 | 13 | 2 | 526 | 1.0273 |
| 12 | 14 | 2 | 602 | 1.1758 |
| 13 | 15 | 2 | 679 | 1.3262 |
| 14 | 16 | 4 | 378 | 1.4766 |
| 15 | 17 | 4 | 434 | 1.6953 |
| 16 | 18 | 4 | 490 | 1.9141 |
| 17 | 19 | 4 | 553 | 2.1602 |
| 18 | 20 | 4 | 616 | 2.4063 |
| 19 | 21 | 4 | 658 | 2.5703 |
| 20 | 22 | 6 | 466 | 2.7305 |
| 21 | 23 | 6 | 517 | 3.0293 |
| 22 | 24 | 6 | 567 | 3.3223 |
| 23 | 25 | 6 | 616 | 3.6094 |
| 24 | 26 | 6 | 666 | 3.9023 |
| 25 | 27 | 6 | 719 | 4.2129 |
| 26 | 28 | 6 | 772 | 4.5234 |
| 27 | N/A | 6 | 822 | 4.8164 |
| 28 | N/A | 6 | 873 | 5.1152 |
| 29 | 29 | 2 | reserved | |
| 30 | 30 | 4 | | |
| 31 | 31 | 6 | | |

In certain embodiments, it can specify that broadcast PDSCH uses the MCS entries corresponding to a portion of the table. As an example, in the table above, the broadcast PDSCH may use the MCS entries corresponding to the spectral efficiencies shown in underline.

Method B-2. Specifically construct an MCS table for broadcast PDSCH.

In certain embodiments, the MCS table specifically designed for broadcast PDSCH may contain QPSK only, and with code rates lower than what's available for eMBB payload. One example is shown below.

As can be observed, there only needs to be 16 entries in the MCS table, instead of the 32-entry MCS table for eMBB payload. Thus, one bit in the MCS field of DCI is saved. The saved bit can be used to provide other information to the UE. Alternatively, this bit can be used to indicate whether to use the specifically-designed table for broadcast PDSCH or the default MCS table. As discussed above, only QPSK is typically supported for broadcast PDSCH.

| MCS Index $I_{MCS}$ for BLER = $10^{-5}$ | Modulation Order | Code rate R × 1024 | Spectral efficiency |
|---|---|---|---|
| 0 | 2 | 32 | 0.0625 |
| 1 | 2 | 41 | 0.0801 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 2 | 679 | 1.3262 |

Third and Fourth Set of Embodiments: Improve Reliability Via Repetition in Time Domain In the third set of embodiments, slot aggregation is used for broadcasting PDSCHs similar to normal PDSCH. The slot aggregation related information can be provided in cell-specific RRC messages or via using some of the unused/reserved bits in corresponding DCI.

In the fourth set of embodiments, time domain repetitions may be introduced. In some embodiments, the time domain repetitions may be indicated in DCI for broadcasting PDSCHs.

In certain embodiments, only PDSCH is repeated, e.g., only one PDCCH is used to schedule all the PDSCH repetitions, where same redundancy version (RV) or some fixed RV patterns can be assumed in all the repetitions.

In certain embodiments, PDSCH repetition bits, PDSCHrep, may be introduced in the corresponding DCI to indicate the repetition periodicity, in which same PDSCH frequency time positions can be assumed in each repetition period.

For example, using two bits, repetition can be defined as below:
00→no repetition
1→repeating with 20 ms periodicity
10→repeating with 40 ms periodicity
11→repeating with 80 ms periodicity In certain embodiments, both PDCCH and PDSCH are repeated, and some unused bits are used for repetition ID in the DCI for UE to do soft combining. In some embodiments, the repetition ID may be one separate parameter. For example, using two bits for the repetition ID:
00→$1^{st}$ transmission
1→$2^{nd}$ transmission
10→$3^{rd}$ transmission
11→$4^{th}$ transmission In some embodiments, the repetition ID may be tied to other known parameters, e.g. RV pattern in DCI, RV0 means $1^{st}$ transmission, RV3 is the last transmission or in some predefined order.

Fifth Set of Embodiments: Improve Reliability Via Repetition in Frequency Domain In the fifth set of embodiments, frequency domain repetitions can be introduced by indicating in DCI for broadcasting PDSCHs. For example, techniques described above with respect to the third and fourth set of embodiments of time domain repetition may be applied here. In particular, the frequency domain may be considered instead of time domain and the signaling needed or predefined can be, for example, frequency domain positions and the RV patterns.

Sixth Set of Embodiments: Using an Inflated TBS to Obtain Larger PRB Allocation

According to embodiments in the sixth set of embodiments, a larger number of PRBs may be scheduled to carry a payload size larger than the actual size of the transmission block, and the large payload contains the actual (desired) information bits and the padded bits. In this manner, gain would be provided from frequency-diversity when more PRBs are used in frequency domain (and in DL, more RB typically also means more power). For the special case of random access Msg2, the gNB may include multiple RAR (random access response). In case the gNB has only one real RAR to send, it could include one or more virtual RAR to inflate the TBS size.

For all the embodiments above, the methods can be applied but not limited to the broadcasting PDSCHs, i.e. it can also be used for normal PDSCHs if needed in some scenarios when further PDSCH performance enhancement is needed.

FIG. 1: A wireless network in accordance with some embodiments.

Although the subject matter described herein may be implemented in any appropriate type of system using any suitable components, the embodiments disclosed herein are described in relation to a wireless network, such as the example wireless network illustrated in FIG. 1. For simplicity, the wireless network of FIG. 1 only depicts network 106, network nodes 160 and 160b, and WDs 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/ or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 1, network node 160 includes processing circuitry 170, device readable medium 180, interface 190, auxiliary equipment 184, power source 186, power circuitry 187, and antenna 162. Although network node 160 illustrated in the example wireless network of FIG. 1 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 1 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network, and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Figure 2:
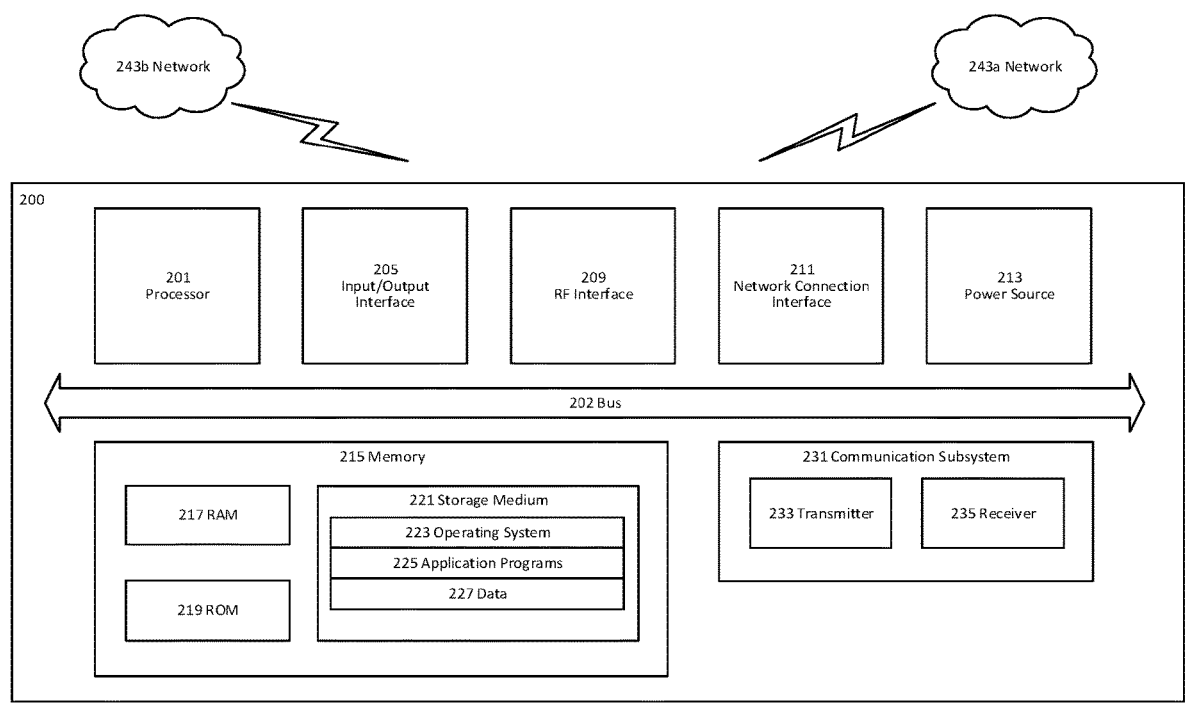
FIG. 2 illustrates an example user equipment, in accordance with certain embodiments.

FIG. 2: User Equipment in accordance with some embodiments

FIG. 2 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 2200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 2, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 2 is a UE, the components discussed herein are equally applicable to a WD, and vice-versa.

In FIG. 2, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 2, or only a subset of the components. The level of integration between the components may vary from one UE to another UE. Further, certain UEs may contain multiple instances of a component, such as multiple processors, memories, transceivers, transmitters, receivers, etc.

In FIG. 2, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 2, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 2, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 3:
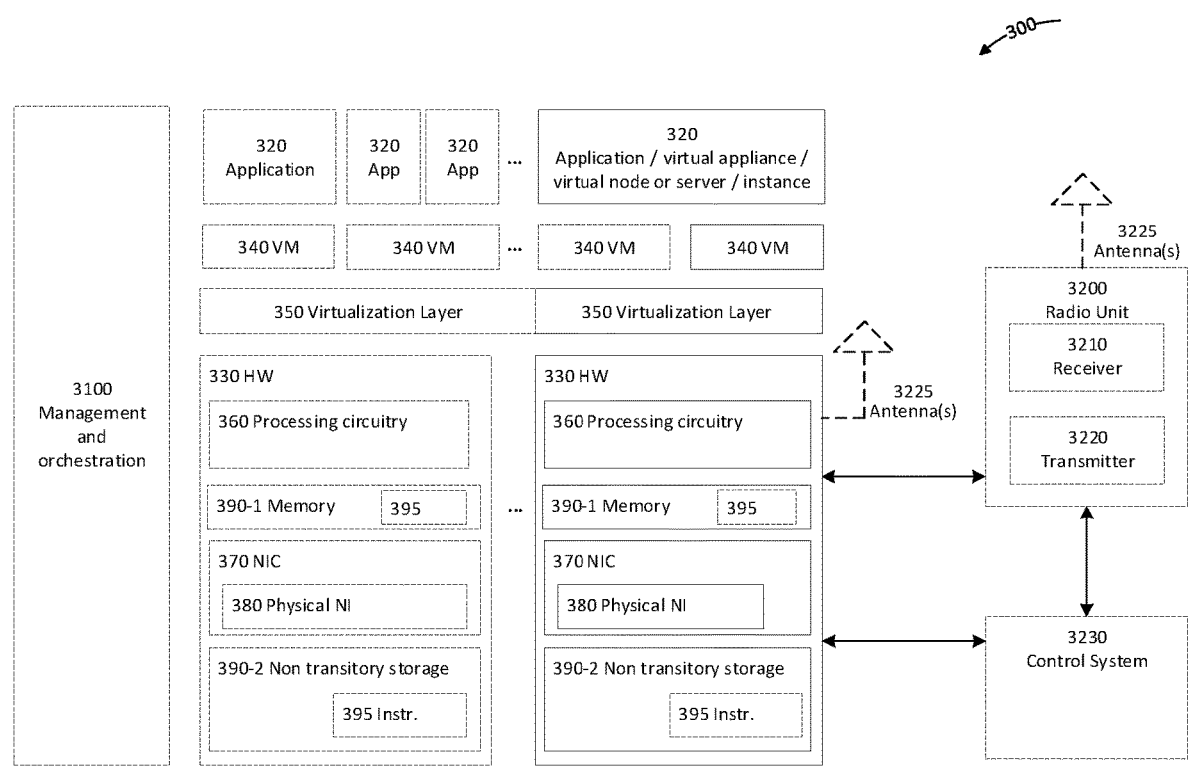
FIG. 3 illustrates an example virtualization environment, in accordance with certain embodiments.

FIG. 3: Virtualization environment in accordance with some embodiments

FIG. 3 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 3, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 3.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signalling can be effected with the use of control system 3230 which may alternatively be used for communication between the hardware nodes 330 and radio units 3200.

Figure 4:
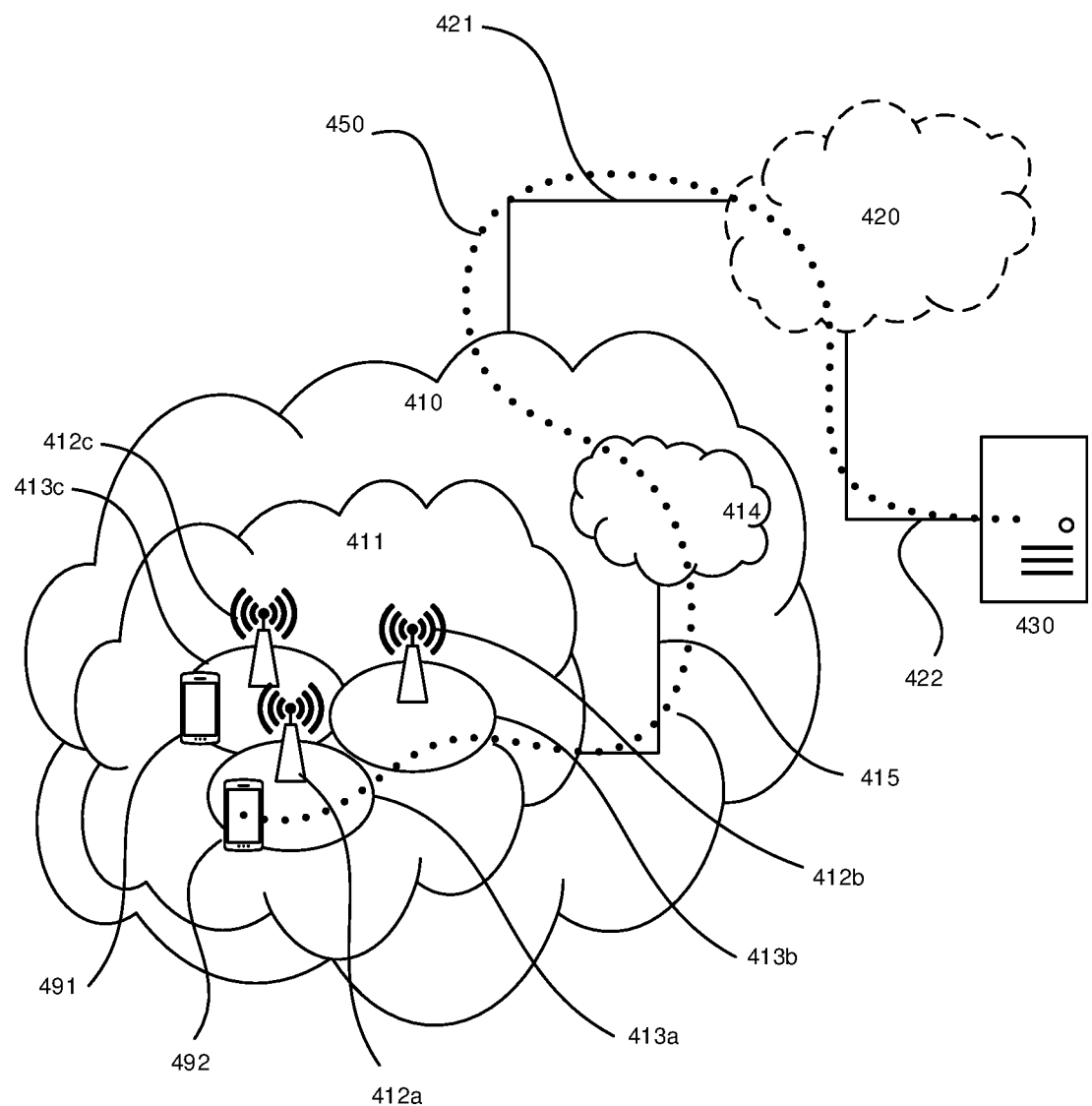
FIG. 4 illustrate an example telecommunication network connected via an intermediate network to a host computer, in accordance with certain embodiments.

FIG. 4: Telecommunication network connected via an intermediate network to a host computer in accordance with some embodiments With reference to FIG. 4, in accordance with an embodiment, a communication system includes telecommunication network 410, such as a 3GPP-type cellular network, which comprises access network 411, such as a radio access network, and core network 414. Access network 411 comprises a plurality of base stations 412*a*, 412*b*, 412*c*, such as NBs, eNBs, gNBs or other types of wireless access points, each defining a corresponding coverage area 413*a*, 413*b*, 413*c*. Each base station 412*a*, 412*b*, 412*c* is connectable to core network 414 over a wired or wireless connection 415. A first UE 491 located in coverage area 413*c* is configured to wirelessly connect to, or be paged by, the corresponding base station 412*c*. A second UE 492 in coverage area 413*a* is wirelessly connectable to the corresponding base station 412*a*. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 4 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 5:
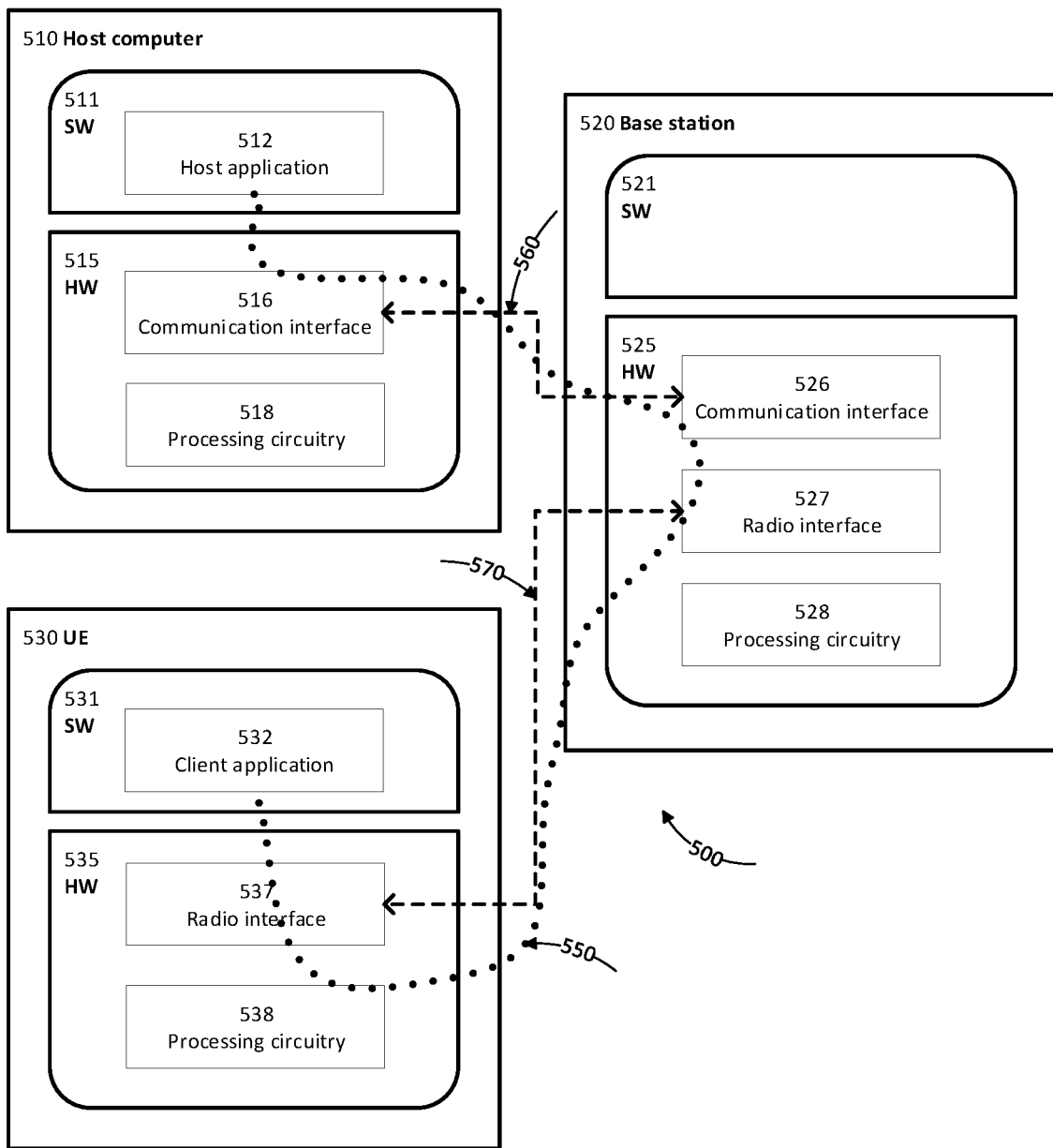
FIG. 5 illustrates an example host computer communicating via a base station with a user equipment over a partially wireless connection, in accordance with certain embodiments.

FIG. 5: Host computer communicating via a base station with a user equipment over a partially wireless connection in accordance with some embodiments Example implementations, in accordance with an embodiment, of the UE, base station and host computer discussed in the preceding paragraphs will now be described with reference to FIG. 5. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 5) served by base station 520. Communication interface 526 may be configured to facilitate connection 560 to host computer 510. Connection 560 may be direct or it may pass through a core network (not shown in FIG. 5) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 5 may be similar or identical to host computer 430, one of base stations 412a, 412b, 412c and one of UEs 491, 492 of FIG. 4, respectively. This is to say, the inner workings of these entities may be as shown in FIG. 5 and independently, the surrounding network topology may be that of FIG. 4.

In FIG. 5, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the data rate or reduce latency and thereby provide benefits such as reduced user waiting time and better responsiveness.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

FIG. 6: Methods implemented in a communication system including a host computer, a base station and a user equipment in accordance with some embodiments FIG. 6 is a flowchart illustrating a method implemented in a communication system, in accordance with one embodiment. The communication system includes a host computer, a base station and a UE which may be those described with reference to FIGS. 4 and 5. For simplicity of the present disclosure, only drawing references to FIG. 6 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

FIG. 7: Methods implemented in a communication system including a host computer, a base station and a user equipment in accordance with some embodiments FIG. 7 is a flowchart illustrating a method implemented in a communication system, in accordance with one embodiment. The communication system includes a host computer, a base station and a UE which may be those described with reference to FIGS. 4 and 5. For simplicity of the present disclosure, only drawing references to FIG. 7 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 8:
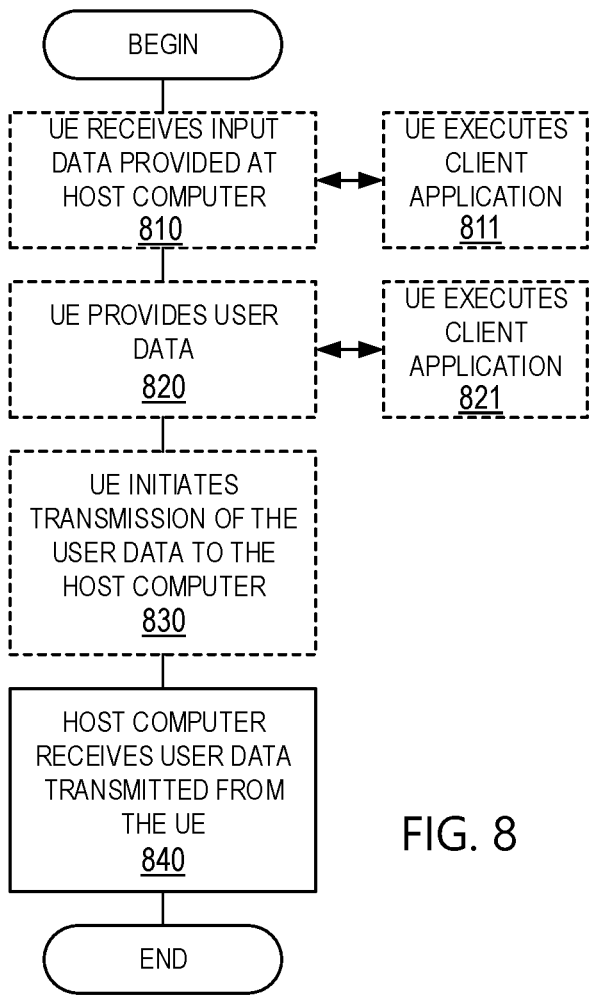
FIG. 8 is a flowchart illustrating a third method implemented in a communication system, in accordance with certain embodiments.

FIG. 8: Methods implemented in a communication system including a host computer, a base station and a user equipment in accordance with some embodiments FIG. 8 is a flowchart illustrating a method implemented in a communication system, in accordance with one embodiment. The communication system includes a host computer, a base station and a UE which may be those described with reference to FIGS. 4 and 5. For simplicity of the present disclosure, only drawing references to FIG. 8 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 9:
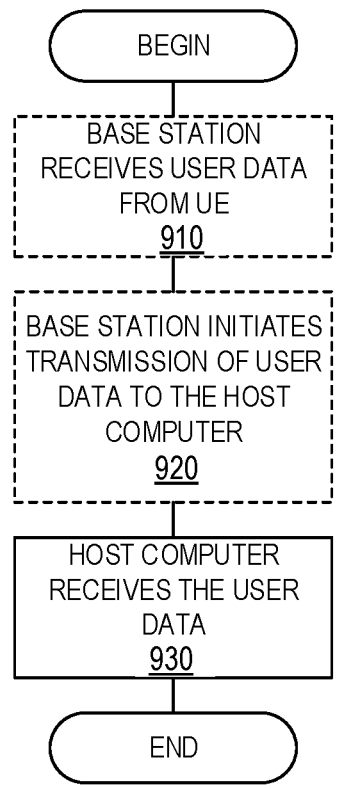
FIG. 9 is a flowchart illustrating a fourth method implemented in a communication system, in accordance with certain embodiments.

FIG. 9: Methods implemented in a communication system including a host computer, a base station and a user equipment in accordance with some embodiments FIG. 9 is a flowchart illustrating a method implemented in a communication system, in accordance with one embodiment. The communication system includes a host computer, a base station and a UE which may be those described with reference to FIGS. 4 and 5. For simplicity of the present disclosure, only drawing references to FIG. 9 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 10:
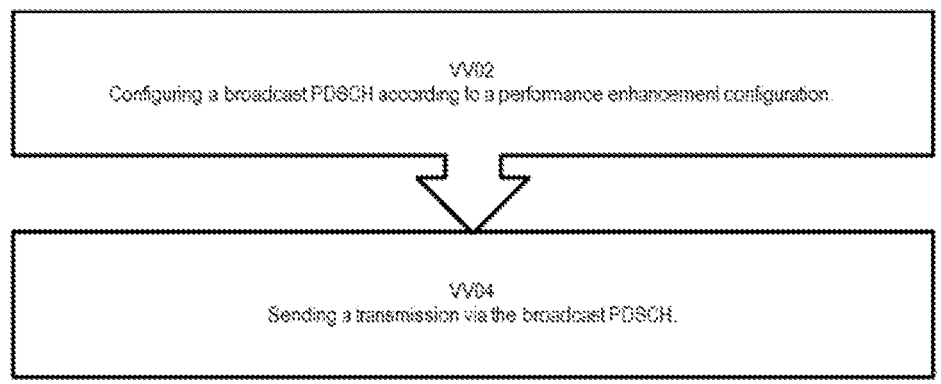
FIG. 10 illustrates an example method performed by a network node, in accordance with certain embodiments.

FIG. 10: Method in accordance with some embodiments

FIG. 10 depicts a method in accordance with certain embodiments. In certain embodiments, the method may be performed by a network node, such as a base station (e.g., gNB) described above. The method begins at step VV02 with configuring a broadcast PDSCH according to a performance enhancement configuration. For example, the performance enhancement configuration may comprise any one or more of Embodiments 1-6 described above (e.g., provide lower code rate via adjustment to the TBS determination procedure, provide MCS levels with lower spectral efficiency, improve reliability via repetition in time domain, improve reliability via repetition in frequency domain, and/ or use an inflated TBS to obtain larger PRB allocation). The method proceeds to step VV04 with sending a transmission via the broadcast PDSCH.

Figure 11:
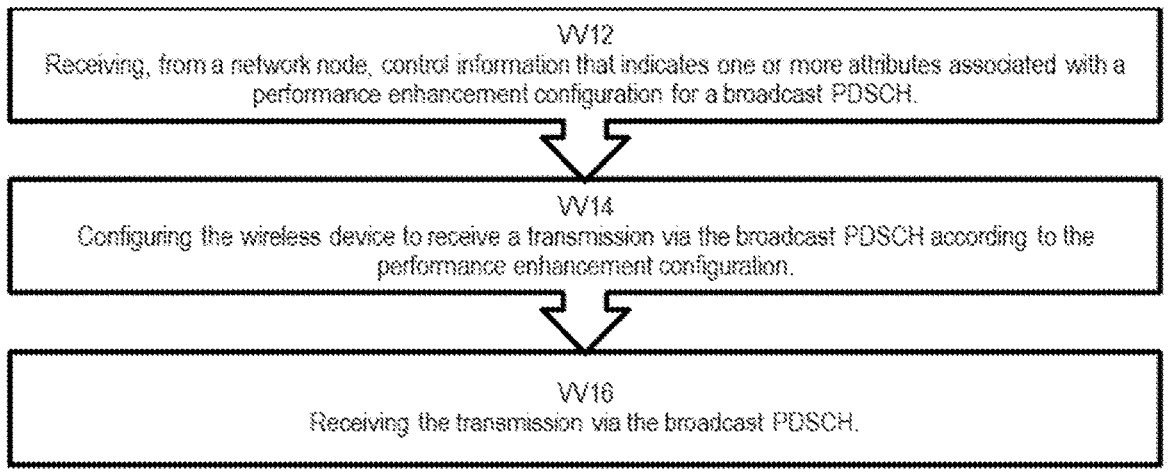
FIG. 11 illustrates an example method performed by a wireless device, such as a user equipment, in accordance with certain embodiments.

FIG. 11: Method in accordance with some embodiments

FIG. 11 depicts a method in accordance with particular embodiments. In certain embodiments, the method may be performed by a wireless device (WD), such as a user equipment (UE), examples of which are described above. The method begins at step VV12 with receiving control information from a network node. As an example, the control information may be received in DCI or RRC signalling. The control information indicates one or more attributes associated with a performance enhancement configuration for a broadcast PDSCH. Any suitable attributes may be indicated in control information. As an example, the attributes may indicate whether PDSCH repetitions are configured in a frequency domain and/or a time domain. The attributes may further indicate how the repetitions are configured (e.g., periodicity, repetition ID, etc.). The method proceeds to step VV14 with configuring the wireless device to receive the transmission via the broadcast PDSCH according to the performance enhancement configuration and step VV16 receiving a transmission from the network node via the broadcast PDSCH configured according to the performance enhancement configuration.

Figure 12:
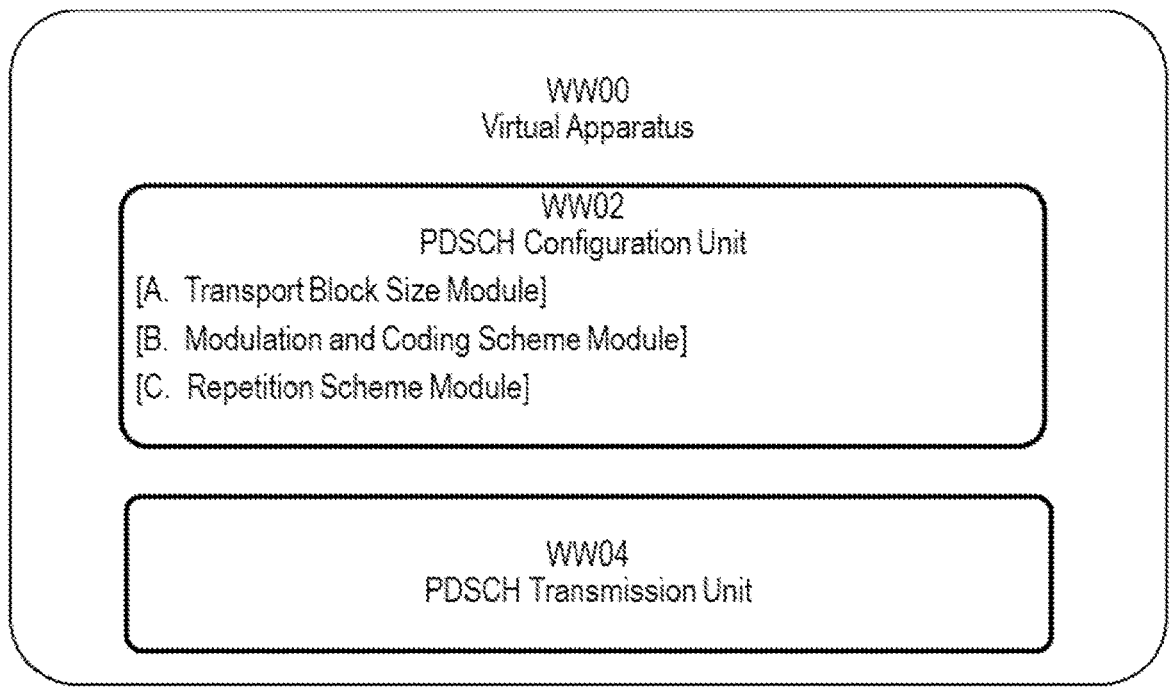
FIG. 12 illustrates a schematic block diagram of an apparatus in a wireless network, in accordance with certain embodiments.

FIG. 12: Virtualization apparatus in accordance with some embodiments

FIG. 12 illustrates a schematic block diagram of an apparatus WW00 in a wireless network (for example, the wireless network shown in FIG. 1). The apparatus may be implemented in a wireless device or network node (e.g., wireless device 110 or network node 160 shown in FIG. 1). Apparatus WW00 is operable to carry out the example method described with reference to Figure VV and possibly any other processes or methods disclosed herein. It is also to be understood that the method of Figure VV is not necessarily carried out solely by apparatus WW00. At least some operations of the method can be performed by one or more other entities.

Virtual Apparatus WW00 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause PDSCH configuration unit WW02, PDSCH transmission unit WW04, and any other suitable units of apparatus WW00 to perform corresponding functions according one or more embodiments of the present disclosure.

As illustrated in FIG. 12, apparatus WW00 includes PDSCH configuration unit WW02 and PDSCH transmission unit WW04. PDSCH configuration unit WW02 is configured to configure a broadcast PDSCH according to a performance enhancement configuration. The performance enhancement configuration may comprise any one or more of Embodiments 1-6 described above. For example, in certain embodiments, PDSCH configuration unit WW02 may comprise a TBS Module [A] that adjusts the TBS determination procedure to provide a lower code rate (e.g., Embodiment 1) and/or inflates TBS to obtain a larger PRB allocation (e.g., Embodiment 6). In certain embodiments, PDSCH configuration unit WW02 may comprise an MCS module [B] to provide MCS levels with lower spectral efficiency (e.g., Embodiment 2). In certain embodiments, PDSCH configuration unit WW02 may comprise a repetition scheme module [C] to configure repetition in time domain (e.g., Embodiment 3 or 4) and/or to configure repetition in frequency domain (e.g., Embodiment 5). PDSCH transmission unit WW04 sends transmission on the broadcast PDSCH according to the performance enhancement configuration.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In some embodiments a computer program, computer program product or computer readable storage medium comprises instructions which when executed on a computer perform any of the embodiments disclosed herein. In further examples the instructions are carried on a signal or carrier and which are executable on a computer wherein when executed perform any of the embodiments disclosed herein.

Figure 13:
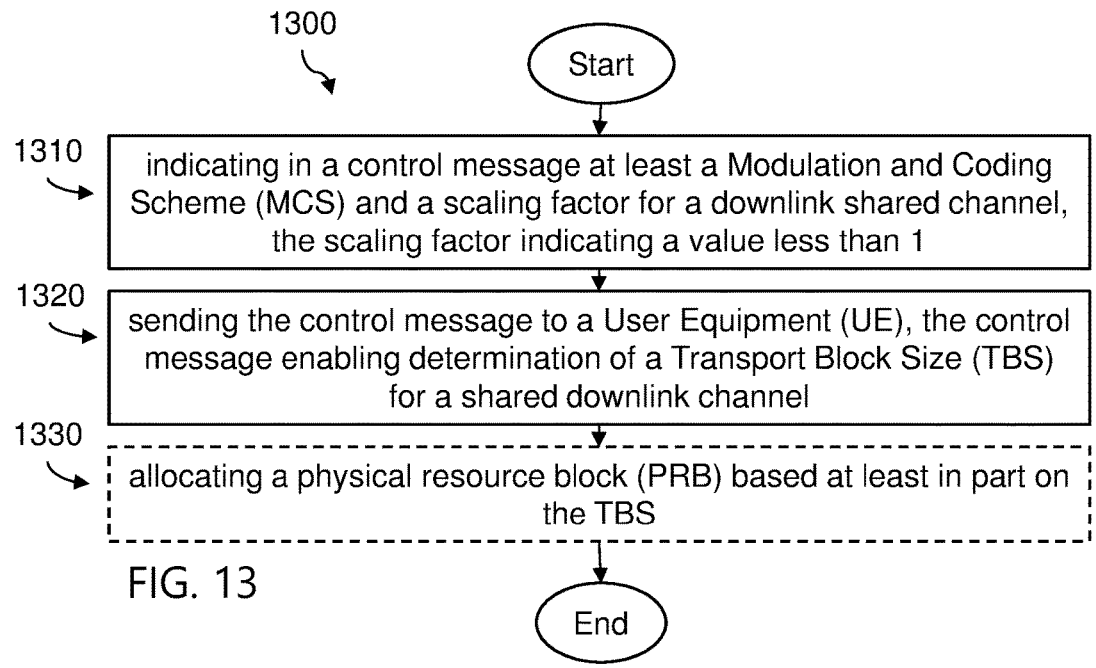
FIG. 13 illustrates a second example method performed by a network node, in accordance with certain embodiments.

FIG. 13 illustrates a second example method 1300 performed by a network node, in accordance with certain embodiments. Method 1300 may begin at step 1310, wherein the network node indicates in a control message at least a Modulation and Coding Scheme (MCS) and a scaling factor for a downlink shared channel. The scaling factor indicates a value less than 1. For example, the control message may indicate an MCS and a scaling factor of ½ or ¼. In some embodiments, the control message includes at least one bit indicating to use a first scaling factor, e.g., ½, when one of the at least one bits is set to a first value and to use a second scaling factor, e.g., ¼, when set to a second value. In some embodiments, the scaling factor indicated in the control message is carried on a PDCCH. For example, the control message may be a DCI transmitted over a PDCCH.

In certain embodiments, the control message may indicate further indications that may enhance the shared downlink channel transmission. For example, in some embodiments, the control message indicates a time and/or frequency domain repetition.

At step 1320, the control message is sent to a User Equipment (UE). The control message enables the determination of a Transport Block Size (TBS) for a shared downlink channel In certain embodiments, the control message enables the UE to determine an intermediate number of information bits based at least on the MCS and scaling factor. Based on the intermediate number of bits, the UE may determine the TBS.

Method 1300 may include additional steps. In certain embodiments, the network node may allocate a physical resource block based at least in part on the TBS, as shown in step 1330. For example, a network node may determine the TBS and then allocate the PRB based on the TBS. Accordingly, the PRB may reflect any performance enhancements for the physical downlink channel due to adjusting the TBS.

Figure 14:
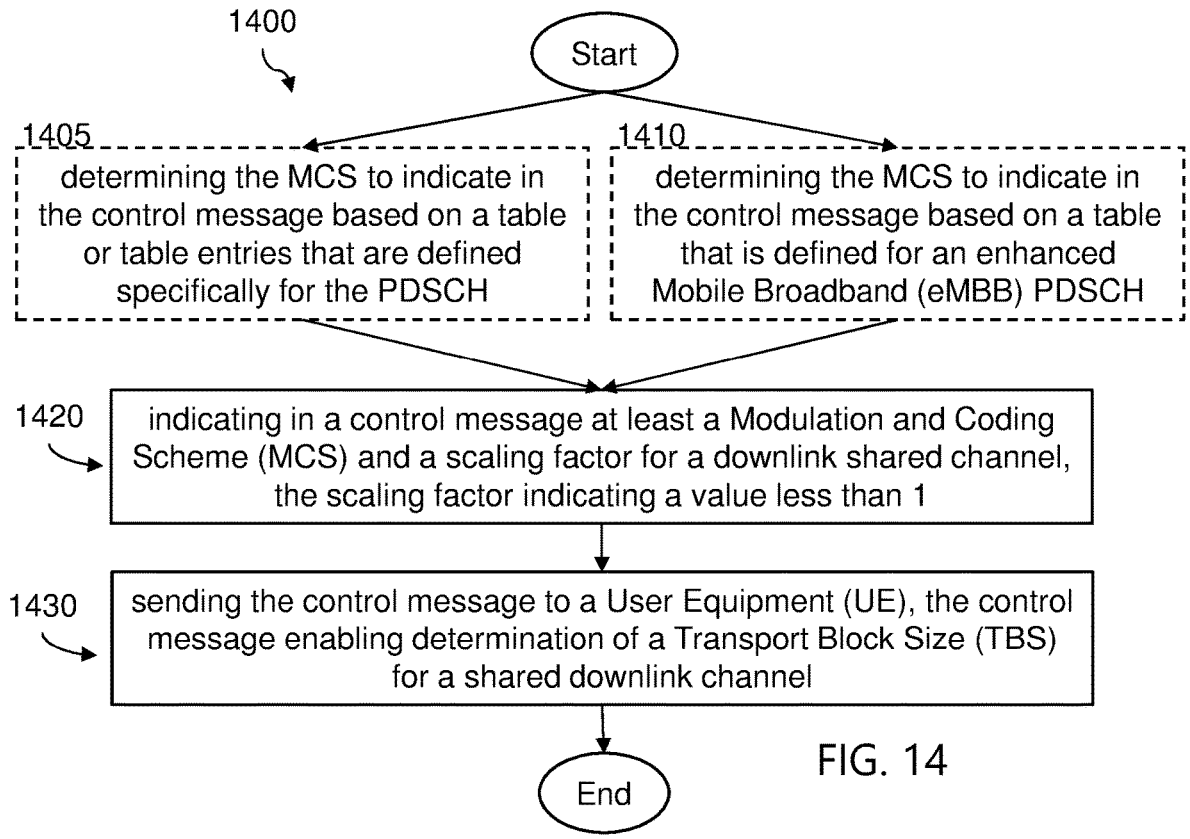
FIG. 14 illustrates a third example method performed by a network node, in accordance with certain embodiments.

FIG. 14 illustrates a third example method 1400 performed by a network node, in accordance with certain embodiments. Method 1400 may begin with one of step

1405 and 1410. In certain embodiments, method 1400 begins with step 1405, wherein the MCS to indicate in the control message is determined based on a table or table entries that are defined specifically for the PDSCH. For example, a table of MCSs may be specifically constructed and/or used for PDSCH having entries having a lower spectral efficiency than tables for other channels. As another example, a table of MCSs may have entries that are only used for PDSCH that have a lower spectral efficiency. The specifically defined table or table entries may be used to enhance the transmission over the PDSCH, e.g., by altering the TBS determined by a wireless device communicating with the network node over the PDSCH.

Alternatively, in certain embodiments, method 1400 begins with step 1410, which determines the MCS to indicate in the control message based on a table that is defined for an enhanced Mobile Broadband (eMBB) PDSCH. For example, the MCS may be chosen from a certain portion of the table defined for eMBB associated with lower spectral efficiency. In this manner, the network node may determine the MCS to be used in the control message, which may be used by a wireless device to determine the TBS over the PDSCH.

Figure 15:
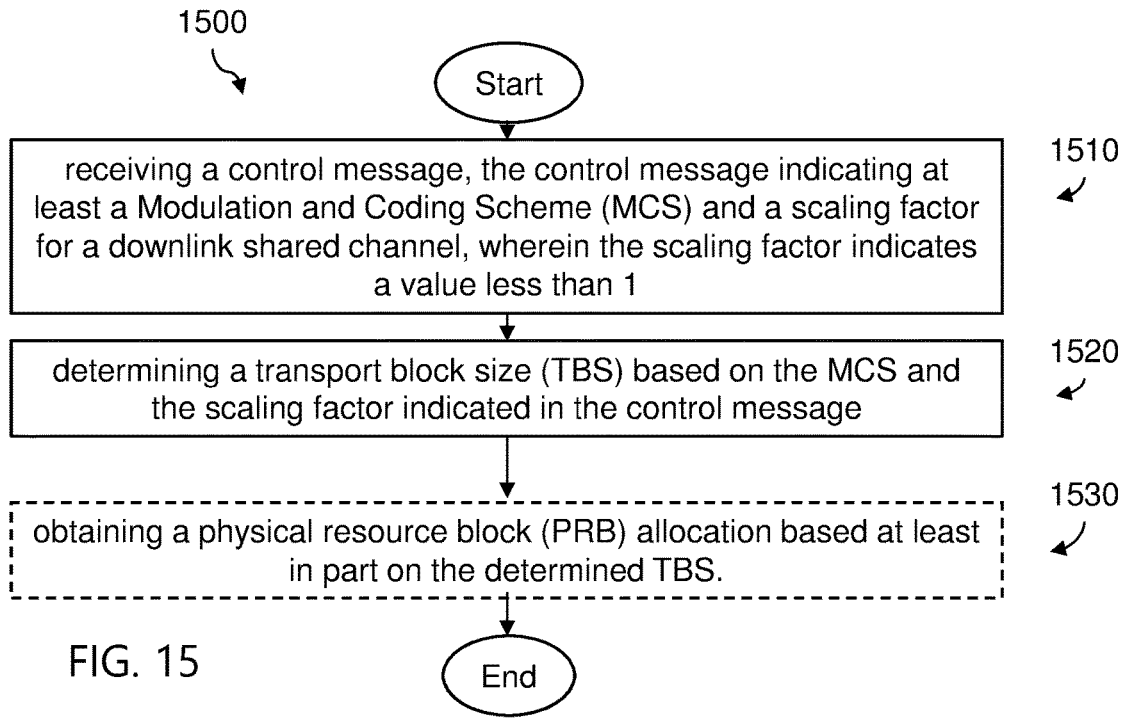
FIG. 15 illustrates a second example method performed by a wireless device, in accordance with certain embodiments.

Steps 1420 and Steps 1430 may occur in a similar manner described above in reference to method 1300's steps 1310 and 1320, respectively. For example, the MCS indicated in the control message may be the MCS determined from the eMBB table or the specifically defined table or table entries for the PDSCH. Similarly, the UE may use the MCS, together with the scaling factor, to determine the TBS. In the example where the MCS is chosen having a lower spectral efficiency, the TBS may be chosen to be larger, thereby improving the transmission over the shared downlink channel FIG. 15 illustrates a second example method 1500 performed by a wireless device, in accordance with certain embodiments. Method 1500 may begin with step 1510, wherein the wireless device receives a control message. The control message indicates at least an MCS and a scaling factor for a downlink shared channel. The scaling factor indicates a value less than 1. For example, a network node may determine the MCS and the scaling factor and send the control message to the wireless device as a broadcast.

After receiving the control message, at step 1520, the wireless device may determine a transport block size (TBS) based on the MCS and the scaling factor indicated in the control message. For example, the wireless device may determine a number of resource elements allocated for downlink shared channel within a PRB. This determination may be adjusted by multiplying one of the values used in the calculation by the scaling factor, such as the intermediate number of information bits, etc. Additionally, the wireless device may also use the MCS (and/or its index) to further determine the MCS. In some embodiments, the scaling factor being less than one inflates the TBS relative to determining the TBS without any scaling factor (or a scaling factor of one). By increasing the TBS, the downlink shared channel communication may be enhanced.

In certain embodiments, method 1500 includes additional optional steps. In some embodiments, at step 1530, the wireless device obtains a physical resource block allocation based at least in part on the determined TBS. The wireless device may then obtain the PRB allocation. In some embodiments, the TBS is inflated, thereby causing a larger PRB allocation at the network node. The larger PRB allocation may be used to communicate on the downlink shared channel at a lower code rate or at a higher redundancy. Accordingly, the downlink shared channel may be enhanced.

Figure 16:
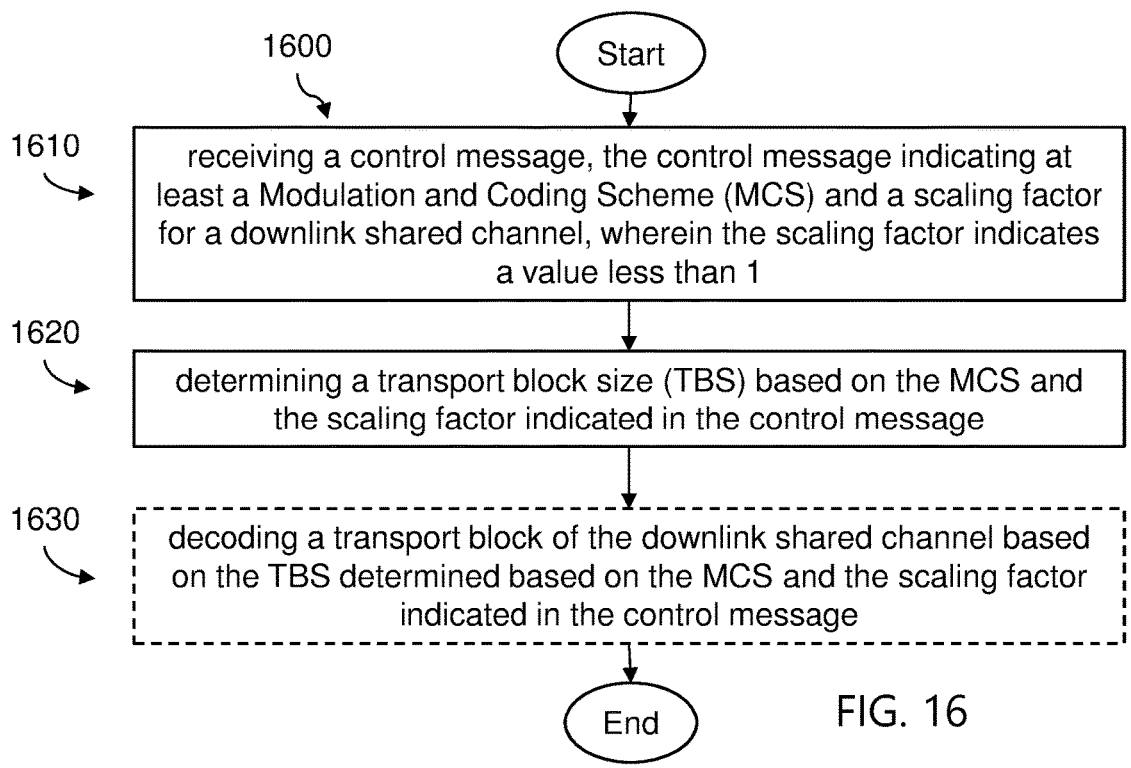
FIG. 16 illustrates a third example method performed by a wireless device, in accordance with certain embodiments.

FIG. 16 illustrates a third example method 1600 performed by a wireless device, in accordance with certain embodiments. Method 1600 may begin similarly to method 1500 with steps 1610 and 1620 corresponding to 1510 and 1520, respectively. In certain embodiments, 1600 further includes the optional step 1630 of decoding a transport block of the downlink shared channel based on the TBS determined based on the MCS and the scaling factor indicated in the control message. For example, the network node may transmit over the downlink shared channel data or control messaging based on resource blocks allocated to the wireless device. The wireless device may receive that transmission and decode it based on the TBS determined by the wireless device. In this manner, the wireless device may receive a higher-quality transmission over the downlink shared channel based on the TBS determined based on the MCS and scaling factor.

Modifications, additions, or omissions may be made to any of methods 1300, 1400, 1500 and 1600 depicted in FIGS. 13-16. Any steps may be performed in parallel or in any suitable order. For example, in certain embodiments, one or more steps of methods 1300, 1400, 1500 and 1600 may be repeated for a different performance coating and/or separate fluorescent layer. Furthermore, methods 1300, 1400, 1500 and 1600 may include more, fewer, or other steps. Additionally, one or more of the steps of methods 1300, 1400, 1500 and 1600, or embodiments thereof, may be performed by any suitable component or combination of components of network nodes 160, 330, 412, 520 or wireless devices 110, 200, 330, 491, 492, 530, or any other component described herein.

As discussed above, certain embodiments of the present disclosure may be implemented by modifying section 5.1.3 of 3GPP TS 38.214. The following paragraphs provide an example of how certain aspects of the present disclosure may be included in section 5.1.3, e.g., as shown below in a more recent version, V15.2.0.

5.1.3 Modulation Order, Target Code Rate, Redundancy Version and Transport Block Size Determination To determine the modulation order, target code rate, and transport block size(s) in the physical downlink shared channel, the UE shall first

- read the 5-bit modulation and coding scheme field ($I_{MCS}$) in the DCI to determine the modulation order ($Q_m$) and target code rate (R) based on the procedure defined in Subclause 5.1.3.1, and
- read redundancy version field (rv) in the DCI to determine the redundancy version.

and second

- the UE shall use the number of layers (u), the total number of allocated PRBs before rate matching ($n_{PRB}$) to determine to the transport block size based on the procedure defined in Subclause 5.1.3.2.

The UE may skip decoding a transport block in an initial transmission if the effective channel code rate is higher than 0.95, where the effective channel code rate is defined as the number of downlink information bits (including CRC bits) divided by the number of physical channel bits on PDSCH. If the UE skips decoding, the physical layer indicates to higher layer that the transport block is not successfully decoded.

5.1.3.1 Modulation Order and Target Code Rate Determination

For the PDSCH scheduled by a PDCCH with DCI format 1_0 or format 1_1 with CRC scrambled by C-RNTI, new- RNTI, TC-RNTI, CS-RNTI, SI-RNTI, RA-RNTI, or P-RNTI, if the higher layer parameter mcs-Table given by PDSCH-Config is set to 'qam256', and the PDSCH is scheduled by a PDCCH with a DCI format 1_1 and the CRC is scrambled by C-RNTI or CS-RNTI the UE shall use $I_{MCS}$ and Table 5.1.3.1-2 to determine the modulation order ($Q_m$) and Target code rate (R) used in the physical downlink shared channel.

elseif the UE is not configured with new-RNTI, the higher layer parameter mcs-Table given by PDSCH-Config is set to 'qam64LowSE', and the PDSCH is scheduled with C-RNTI, and the PDSCH is assigned by a PDCCH in a UE-specific search space the UE shall use $I_{MCS}$ and Table 5.1.3.1-3 to determine the modulation order ($Q_m$) and Target code rate (R) used in the physical downlink shared channel.

elseif the UE is configured with new-RNTI, and the PDSCH is scheduled with new-RNTI the UE shall use $I_{MCS}$ and Table 5.1.3.1-3 to determine the modulation order ($Q_m$) and Target code rate (R) used in the physical downlink shared channel.

elseif the UE is not configured with the higher layer parameter mcs-Table given by SPS-config, the higher layer parameter mcs-Table given by PDSCH-Config is set to 'qam256', the PDSCH is scheduled with CS-RNTI, and the PDSCH is assigned by a PDCCH with DCI format 1_1 the UE shall use $I_{MCS}$ and Table 5.1.3.1-2 to determine the modulation order ($Q_m$) and Target code rate (R) used in the physical downlink shared channel.

elseif the UE is configured with the higher layer parameter mcs-Table given by SPS-config set to 'qam64LowSE', and the PDSCH is scheduled with CS-RNTI the UE shall use Imo' and Table 5.1.3.1-3 to determine the modulation order ($Q_m$) and Target code rate (R) used in the physical downlink shared channel.

else the UE shall use Imo' and Table 5.1.3.1-1 to determine the modulation order ($Q_m$) and Target code rate (R) used in the physical downlink shared channel.

end

The UE is not expected to decode a PDSCH scheduled with P-RNTI, RA-RNTI, SI-RNTI and $Q_m$>2

TABLE 5.1.3.1-1

MCS index table 1 for PDSCH

| MCS Index $I_{MCS}$ | Modulation Order $Q_m$ | Target code Rate R × [1024] | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

TABLE 5.1.3.1-2

MCS index table 2 for PDSCH

| MCS Index $I_{MCS}$ | Modulation Order $Q_m$ | Target code Rate R × [1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | reserved | |
| 29 | 4 | reserved | |
| 30 | 6 | reserved | |
| 31 | 8 | reserved | |

TABLE 5.1.3.1-3

MCS index table 3 for PDSCH

| MCS Index $I_{MCS}$ | Modulation Order $Q_m$ | Target code Rate R × [1024] | Spectral efficiency |
|---|---|---|---|
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |

TABLE 5.1.3.1-3-continued

MCS index table 3 for PDSCH

| MCS Index $I_{MCS}$ | Modulation Order $Q_m$ | Target code Rate R × [1024] | Spectral efficiency |
|---|---|---|---|
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 4 | 340 | 1.3281 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 6 | 438 | 2.5664 |
| 22 | 6 | 466 | 2.7305 |
| 23 | 6 | 517 | 3.0293 |
| 24 | 6 | 567 | 3.3223 |
| 25 | 6 | 616 | 3.6094 |
| 26 | 6 | 666 | 3.9023 |
| 27 | 6 | 719 | 4.2129 |
| 28 | 6 | 772 | 4.5234 |
| 29 | 2 | reserved | |
| 30 | 4 | reserved | |
| 31 | 6 | reserved | |

5.1.3.2 Transport Block Size Determination

In case the higher layer parameter maxNrofCodeWordsScheduledByDCI indicates that two codeword transmission is enabled, then a transport block is disabled by DCI format 1_1 if $I_{MCS}$=26 and if $rv_{id}$=1 for the corresponding transport block, otherwise the transport block is enabled. If both transport blocks are enabled, transport block 1 and 2 are mapped to codeword 0 and 1 respectively. If only one transport block is enabled, then the enabled transport block is always mapped to the first codeword.

For the PDSCH assigned by a PDCCH with DCI format 1_0 or format 1_1 with CRC scrambled by C-RNTI, new-RNTI, TC-RNTI, CS-RNTI, or SI-RNTI, if Table 5.1.3.1-2 is used and $0 \leq I_{MCS} \leq 27$, or a table other than Table 5.1.3.1-2 is used and $0 \leq I_{MCS} \leq 28$, the UE shall, except if the transport block is disabled in DCI format 1_1, first determine the TBS as specified below:

1) The UE shall first determine the number of REs ($N_{RE}$) within the slot.

A UE first determines the number of REs allocated for PDSCH within a PRB ($N'_{RE}$) by $N'_{RE} = N_{sc}^{RB} \cdot N_{symb}^{sh} - N_{DMRS}^{PRB} - N_{oh}^{PRB}$, where $N_{sc}^{RB}=12$ is the number of subcarriers in a physical resource block, $N_{symb}^{sh}$ is the number of symbols of the PDSCH allocation within the slot, $N_{DMRS}^{PRB}$ is the number of REs for DM-RS per PRB in the scheduled duration including the overhead of the DM-RS CDM groups without data, as indicated by DCI format 1_1 or as described for format 1_0 in Subclause 5.1.6.2, and $N_{oh}^{PRB}$ is the overhead configured by higher layer parameter xOverhead in PDSCH-ServingCellConfig. If the xOverhead in PDSCH-ServingCellconfig is not configured (a value from 0, 6, 12, or 18), the $N_{oh}^{PRB}$ is set to 0. If the PDSCH is scheduled by PDCCH with a CRC scrambled by SI-RNTI, RA-RNTI or P-RNTI, $N_{oh}^{PRB}$ is assumed to be 0.

A UE determines the total number of REs allocated for PDSCH ($N_{RE}$) by $N_{RE} = \min(156, N'_{RE}) \cdot n_{PRB}$, where $n_{PRB}$ is the total number of allocated PRBs for the UE.

2) Intermediate number of information bits ($N_{info}$) is obtained by $$N_{info} = N_{RE} \cdot R \cdot Q_m \cdot \upsilon.$$

If $N_{info} \leq 3824$
Use step 3 as the next step of the TBS determination
else
Use step 4 as the next step of the TBS determination
end if 3) When $N_{info} \leq 3824$, TBS is determined as follows quantized intermediate number of information bits $$N'_{info} = \max\left(24, 2^n \cdot \left\lfloor \frac{N_{info}}{2^n} \right\rfloor\right),$$

where $n = \max(3, \lfloor \log_2(N_{info}) \rfloor - 6)$.

use Table 5.1.3.2-2 find the closest TBS that is not less than $N'_{info}$.

TABLE 5.1.3.2-2

TBS for $N_{info} \leq 3824$

| Index | TBS |
|---|---|
| 1 | 24 |
| 2 | 32 |
| 3 | 40 |
| 4 | 48 |
| 5 | 56 |
| 6 | 64 |
| 7 | 72 |
| 8 | 80 |
| 9 | 88 |
| 10 | 96 |
| 11 | 104 |
| 12 | 112 |
| 13 | 120 |
| 14 | 128 |
| 15 | 136 |
| 16 | 144 |
| 17 | 152 |
| 18 | 160 |
| 19 | 168 |
| 20 | 176 |
| 21 | 184 |
| 22 | 192 |
| 23 | 208 |
| 24 | 224 |
| 25 | 240 |
| 26 | 256 |
| 27 | 272 |
| 28 | 288 |
| 29 | 304 |
| 30 | 320 |
| 31 | 336 |
| 32 | 352 |
| 33 | 368 |
| 34 | 384 |
| 35 | 408 |
| 36 | 432 |
| 37 | 456 |
| 38 | 480 |
| 39 | 504 |
| 40 | 528 |
| 41 | 552 |
| 42 | 576 |
| 43 | 608 |
| 44 | 640 |
| 45 | 672 |
| 46 | 704 |
| 47 | 736 |
| 48 | 768 |
| 49 | 808 |
| 50 | 848 |
| 51 | 888 |
| 52 | 928 |
| 53 | 984 |
| 54 | 1032 |
| 55 | 1064 |
| 56 | 1128 |

TABLE 5.1.3.2-2-continued

TBS for $N_{info} \leq 3824$

| Index | TBS |
|---|---|
| 57 | 1160 |
| 58 | 1192 |
| 59 | 1224 |
| 60 | 1256 |
| 61 | 1288 |
| 62 | 1320 |
| 63 | 1352 |
| 64 | 1416 |
| 65 | 1480 |
| 66 | 1544 |
| 67 | 1608 |
| 68 | 1672 |
| 69 | 1736 |
| 70 | 1800 |
| 71 | 1864 |
| 72 | 1928 |
| 73 | 2024 |
| 74 | 2088 |
| 75 | 2152 |
| 76 | 2216 |
| 77 | 2280 |
| 78 | 2408 |
| 79 | 2472 |
| 80 | 2536 |
| 81 | 2600 |
| 82 | 2664 |
| 83 | 2728 |
| 84 | 2792 |
| 85 | 2856 |
| 86 | 2976 |
| 87 | 3104 |
| 88 | 3240 |
| 89 | 3368 |
| 90 | 3496 |
| 91 | 3624 |
| 92 | 3752 |
| 93 | 3824 |

4) When $N_{info} > 3824$, TBS is determined as follows.

quantized intermediate number of information bits $$N'_{info} = \max\left(3840, 2^n \times \text{round}\left(\frac{N_{info} - 24}{2^n}\right)\right), \text{ where } n = \lfloor \log_2(N_{info} - 24) \rfloor - 5$$

and ties in the round
function are broken towards the next largest integer.
- if $R \leq 1/4$ $$TBS = 8 \cdot C \cdot \left\lceil \frac{N'_{info} + 24}{8 * C} \right\rceil - 24, \text{ where } C = \left\lceil \frac{N'_{info} + 24}{3816} \right\rceil$$

else
  if $N'_{info} < 8424$ $$TBS = 8 \cdot C \cdot \left\lceil \frac{N'_{info} + 24}{8 * C} \right\rceil - 24 \text{ where } C = \left\lceil \frac{N'_{info} + 24}{8424} \right\rceil$$

else $$TBS = 8 \cdot \left\lceil \frac{N'_{info} + 24}{8} \right\rceil - 24$$

end if
end if
else if Table 5.1.3.1-2 is used and $28 \leq I_{MCS} \leq 31$,
- the TBS is assumed to be as determined from the DCI transported in the latest PDCCH for the same transport block using $0 \leq I_{MCS} \leq 27$. If there is no PDCCH for the same transport block using $0 \leq I_{MCS} \leq 27$, and if the initial PDSCH for the same transport block is semi-persistently scheduled, the TBS shall be determined from the most recent semi-persistent scheduling assignment PDCCH.
else
- the TBS is assumed to be as determined from the DCI transported in the latest PDCCH for the same transport block using $0 \leq I_{MCS} \leq 28$. If there is no PDCCH for the same transport block using $0 \leq I_{MCS} \leq 28$, and if the initial PDSCH for the same transport block is semi-persistently scheduled, the TBS shall be determined from the most recent semi-persistent scheduling assignment PDCCH.

For the PDSCH assigned by a PDCCH with DCI format 1_0 with CRC scrambled by P-RNTI, or RA-RNTI, TBS determination follows the steps 1-4 with the following modification in step 2: a scaling $N_{info} = S \cdot N_{RE} \cdot R \cdot Q_m \cdot \upsilon$ is applied in the calculation of $N_{info}$, where the scaling factor is determined based on the TB scaling field in the DCI as in Table 5.1.3.2-3.

TABLE 5.1.3.2-3

Scaling factor of $N_{info}$ for P-RNTI and RA-RNTI

| TB scaling field | Scaling factor S |
|---|---|
| 00 | 1 |
| 1 | 0.5 |
| 10 | 0.25 |
| 11 | |

The NDI and HARQ process ID, as signalled on PDCCH, and the TBS, as determined above, shall be reported to higher layers.

The paragraphs above provide an example of how certain aspects of the present disclosure may be included in section 5.1.3 of 3GPP TS 38.214 V15.0.1. In the above example, the DCI includes an $I_{MCS}$ field that can be read to determine the modulation and coding scheme and a TB scaling field that can be read to determine the scaling factor S (e.g., according to Table 5.1.3.2-3). In certain embodiments, the $I_{MCS}$ and TB scaling fields from the above example based on section 5.1.3 of the 3GPP technical specification may be used when performing the methods disclosed herein. For example, the scaling factor "S" from the example based on section 5.1.3 of the 3GPP technical specification may be used as scaling factor "α" described in other examples herein, such as the examples of Methods A-1.

As another example, the methods described above with respect to FIGS. 13 and 14 may indicate in a control message at least an MCS (which may be indicated using the $I_{MCS}$ field of section 5.1.3) and a scaling factor (which may be indicated using the TB scaling field of section 5.1.3) for a downlink shared channel (see e.g., steps 1310 and 1420 discussed above). The methods described above with respect to FIGS. 13 and 14 may send the control message comprising the $I_{MCS}$ field and the TB scaling field of section 5.1.3 to a UE to enable the UE to determine a TBS for a shared downlink channel (see e.g., steps 1320 and 1430 discussed above).

As another example, the methods described above with respect to FIGS. 15 and 16 may receive a control message indicating an MCS (which may be indicated using the $I_{MCS}$ field of section 5.1.3) and a scaling factor (which may be indicated using the TB scaling field of section 5.1.3) for a downlink shared channel (see e.g., steps 1510 and 1610). The methods described above with respect to FIGS. 15 and 16 may determine a TBS based on the $I_{MCS}$ field and TB scaling field indicated in the control message (see e.g., steps

1520 and 1620). For example, the wireless device may scale the TBS by applying Scaling Factor S while calculating $N_{info}$, where the Scaling Factor is determined based on the TB scaling field in the DCI as in Table 5.1.3.2-3. The wireless device may further determine the MCS based on the $I_{MCS}$.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A communication system configured to provide an over-the-top service, the communication system comprising:
   a host computer comprising:
   processing circuitry configured to provide user data for a user equipment (UE), the user data being associated with the over-the-top service; and
   a network interface configured to initiate transmission of the user data toward a cellular network node for transmission to the UE, the network node having a communication interface and processing circuitry, the processing circuitry of the network node configured to perform operations comprising:
   sending a first control message to the UE for assigning a Physical Downlink Shared Channel (PDSCH), the first control message comprising a first Modulation and Coding Scheme (MCS) indication, and wherein the first control message enables the UE to determine, when the first control message comprises a Cyclic Redundancy Check (CRC) scrambled by a first type of Radio Network Temporary Identifier (RNTI) and when the first control message further indicates a scaling factor value of 0.5 or 0.25, a first Transport Block Size (TBS) by scaling a first intermediate number of information bits using the indicated scaling factor value to generate a scaled intermediate number of information bits using the following equation:

$$N_{info}=\alpha*N_{RE}*R*Q_m*\upsilon,$$

where $N_{info}$ is the scaled intermediate number of information bits, $\alpha$ is the scaling factor, $N_{RE}$ is a number of resource elements within a slot, R is a target code rate, $Q_m$ is a modulation order and is a number of layers;
   sending to the UE a second control message for assigning a PDSCH, the second control message comprising a second MCS indication and enabling the UE to determine, when the second control message comprises a CRC scrambled by a second type of RNTI, different from the first type of RNTI, a second TBS based on a second intermediate number of information bits, the second intermediate number of information based at least on the second MCS; and
   transmitting the user data from the host computer to the UE after sending the first or second control message.

2. The communication system of claim 1, wherein the control message comprises at least one bit indicating to use a first scaling factor when a first bit of the at least one bit is set to a first value and to use a second scaling factor when the first bit is set to a second value.

3. The communication system of claim 1, wherein the first type of RNTI comprises a Paging Radio Network Temporary Identifier (P-RNTI) or Random-Access Radio Temporary Network Identifier (RA-RNTI).

4. The communication system of claim 1, wherein the processing circuitry of the network node executes instructions to determine the MCS to indicate in the control message based on a table that is defined for an enhanced Mobile Broadband (eMBB) Physical Downlink Shared Channel (PDSCH).

5. The communication system of claim 1, wherein the processing circuitry of the network node executes instructions to determine the MCS to indicate in the control message based on a table or table entries that are defined specifically for the Physical Downlink Shared Channel (PDSCH).

6. The communication system of claim 1, further comprising:
   the network node; and/or
   the user equipment.

7. The communication system of claim 1, wherein:
   the processing circuitry of the host computer is configured to execute a host application, thereby providing the user data; and
   the host application is configured to interact with a client application executing on the UE, the client application being associated with the host application.

8. A host computer configured to operate in a communication system to provide an over-the-top (OTT) service, the host computer comprising:
   processing circuitry configured to initiate transmission of user data; and
   a network interface configured to transmit the user data to a network node in a cellular network, the network node having a communication interface and processing circuitry, the processing circuitry of the network node configured to perform operations comprising:
   sending to a UE a first control message for assigning a Physical Downlink Shared Channel (PDSCH), the first control message comprising a first Modulation and Coding Scheme (MCS) indication, wherein the first control message enables the UE to determine, when the first control message comprises a Cyclic Redundancy Check (CRC) scrambled by a first type of Radio Network Temporary Identifier (RNTI) and when the first control message further indicates a scaling factor value of 0.5 or 0.25, a first Transport Block Size (TBS) by scaling a first intermediate number of information bits using the indicated scaling factor value to generate a scaled intermediate number of information bits $N_{info}$ using the following equation:

$$N_{info}=\alpha*N_{RE}*R*Q_m*\upsilon,$$

where $\alpha$ is the scaling factor, $N_{RE}$ is a number of resource elements within a slot, R is a target code rate, $Q_m$ is a modulation order and u is a number of layers;
   sending to the UE a second control message for assigning a PDSCH, the second control message comprising a second MCS indication, wherein the second control message enables the UE to determine, when the second control message comprises a CRC scrambled by a second type of RNTI, different from the first type of RNTI, a second TBS based on a second intermediate number of information bits, the second intermediate number of information based at least on the second MCS; and transmitting the user data from the host computer to the UE after sending the second control message to the UE.

9. The host computer of claim 8, wherein the control message comprises at least one bit indicating to use a first scaling factor when a first bit of the at least one bit is set to a first value and to use a second scaling factor when the first bit is set to a second value.

10. The host computer of claim 8, wherein the control message further indicates a time or frequency domain repetition.

11. The host computer of claim 8, wherein the MCS indicated in the control message comprises a lower spectral efficiency MCS according to a third generation partnership project (3GPP) technical specification (TS) 38.214 version 15.2.0 or earlier.

12. The host computer of claim 8, wherein the operations further comprise determining the MCS to indicate in the control message based on a table that is defined for an enhanced Mobile Broadband (eMBB) Physical Downlink Shared Channel (PDSCH).

13. The host computer of claim 8, wherein the operations further comprise determining the MCS to indicate in the control message based on a table or table entries that are defined specifically for the Physical Downlink Shared Channel (PDSCH).

14. The host computer of claim 8, wherein:
the processing circuitry of the host computer is configured to execute a host application, thereby providing the user data; and
the host application is configured to interact with a client application executing on the UE, the client application being associated with the host application.

15. A method implemented in a host computer configured to operate in a communication system that further includes a network node and a user equipment (UE), the method comprising:
providing user data for the UE; and
initiating a transmission carrying the user data to the UE via a cellular network comprising the network node, wherein the network node performs operations comprising:

sending to a wireless device a first control message for assigning a Physical Downlink Shared Channel (PDSCH), the first control message comprising a first Modulation and Coding Scheme (MCS) indication;

wherein the first control message enables the wireless device to determine, when the first control message comprises a Cyclic Redundancy Check (CRC) scrambled by a first type of Radio Network Temporary Identifier (RNTI) and when the first control message further indicates a scaling factor value of 0.5 or 0.25, a first Transport Block Size (TBS) by scaling a first intermediate number of information bits using the indicated scaling factor value to generate a scaled intermediate number of information bits $N_{info}$ using the following equation:

$$N_{info}=\alpha*N_{RE}*R*Q_m*\upsilon,$$

where $\alpha$ is the scaling factor, $N_{RF}$ is a number of resource elements within a slot, R is a target code rate, $Q_m$ is a modulation order and $\upsilon$ is a number of layers;

sending to the wireless device a second control message for assigning a PDSCH, the second control message comprising a second MCS indication; and wherein the second control message enables the wireless device to determine, when the second control message comprises a CRC scrambled by a second type of RNTI, different from the first type of RNTI, a second TB S based on a second intermediate number of information bits, the second intermediate number of information based at least on the second MCS; and transmitting the user data from the host computer to the UE according to the determined TBS.

16. The method of claim 15, wherein the control message comprises at least one bit indicating to use a first scaling factor when a first bit of the at least one bit is set to a first value and to use a second scaling factor when the first bit is set to a second value.

* * * * *

UNITED STATES PATENT AND TRADEMARK OFFICE
CERTIFICATE OF CORRECTION

PATENT NO. : 11,497,035 B2  
APPLICATION NO. : 17/460099  
DATED : November 8, 2022  
INVENTOR(S) : Lin et al.

Page 1 of 5

It is certified that error appears in the above-identified patent and that said Letters Patent is hereby corrected as shown below:

On the Title Page

In Item (63), under "Related U.S. Application Data", in Column 1, Line 2, delete "2020," and insert -- 2020, now Pat. No. 11,184,903, --, therefor.

In Item (30), under "Foreign Application Priority Data", in Column 1, Line 1, delete "Apr. 4, 2018 (CN) ............... PCT/CN2018/081994" and insert
-- Sept. 20, 2018 (WO) ............... PCT/IB2018/057271
Apr. 4, 2018 (CN) ............... PCT/CN2018/081994 --, therefor.

In the Drawings

In Fig. 1, Sheet 1 of 10, delete "170 Wireless Signal" and insert -- Wireless Signal --, therefor.

In Fig. 8, Sheet 7 of 10, for Tag "810", in Line 2, delete "PROVIDED AT" and insert -- PROVIDED BY --, therefor.

In the Specification

In Column 1, Line 8, delete "2020," and insert -- 2020, now Pat No. 11,184,903, --, therefor.

In Column 1, Line 64, delete "0 to$N_{BWP,i}^{size}-1$," and insert -- 0 to $N_{BWP,i}^{size}-1$, --, therefor.

In Column 2, Line 52, delete "random-access" and insert -- random access --, therefor.

In Column 3, Lines 18-19, delete "performance" and insert -- performance. --, therefor.

In Column 3, Line 20, delete "done as below" and insert -- done below --, therefor.

In Column 3, Line 37, delete "(e g for" and insert -- (e.g. for --, therefor.

Signed and Sealed this  
Thirty-first Day of October, 2023

Katherine Kelly Vidal  
*Director of the United States Patent and Trademark Office*

CERTIFICATE OF CORRECTION (continued)
U.S. Pat. No. 11,497,035 B2

In Column 3, Line 45, delete "depending how" and insert -- depending on how --, therefor.

In Column 3, Line 51, delete "compared" and insert -- compared to --, therefor.

In Column 3, Line 61, delete "PDSCH" and insert -- PDSCH. --, therefor.

In Column 4, Line 21, delete "circuitry" and insert -- circuitry is --, therefor.

In Column 4, Line 31, delete "computer readable" and insert -- computer-readable --, therefor.

In Column 4, Line 32, delete "computer readable" and insert -- computer-readable --, therefor.

In Column 4, Lines 32-33, delete "computer readable" and insert -- computer-readable --, therefor.

In Column 4, Line 37, delete "computer readable" and insert -- computer-readable --, therefor.

In Column 5, Line 7, delete "TB S" and insert -- TBS --, therefor.

In Column 5, Line 37, delete "(TB S)" and insert -- (TBS) --, therefor.

In Column 5, Line 52, delete "computer readable" and insert -- computer-readable --, therefor.

In Column 5, Line 53, delete "computer readable" and insert -- computer-readable --, therefor.

In Column 5, Lines 53-54, delete "computer readable" and insert -- computer-readable --, therefor.

In Column 5, Line 58, delete "computer readable" and insert -- computer-readable --, therefor.

In Column 7, Line 5, delete "non," and insert -- none, --, therefor.

In Column 7, Line 21, delete "illustrate" and insert -- illustrates --, therefor.

In Column 7, Line 29, delete "accordance" and insert -- accordance with --, therefor.

In Column 8, Line 14, delete "(u)," and insert -- (υ), --, therefor.

In Column 8, Line 16, delete "determine to" and insert -- determine --, therefor.

In Column 8, Line 32, delete "Imo'" and insert -- $I_{MCS}$ --, therefor.

In Column 8, Line 36, delete "Imo'" and insert -- $I_{MCS}$ --, therefor.

In Column 10, Line 4, delete "($\bar{N}'_{RE}$" and insert -- ($\bar{N}'_{RE}$) --, therefor.

In Column 10, Line 20, delete "($N_{RE}$ by" and insert -- "($N_{RE}$) by --, therefor.

CERTIFICATE OF CORRECTION (continued)  
U.S. Pat. No. 11,497,035 B2

In Column 10, Line 39, delete "find" and insert -- to find --, therefor.

In Column 10, in Table 5.1.3.2-2, Line 1, delete "$N'_{info}$" and insert -- $N'_{info}$ --, therefor.

In Column 11, in Table 5.1.3.2-2-continued, Line 1, delete "$N'_{info}$" and insert -- $N'_{info}$ --, therefor.

In Column 12, Line 16, delete "24" and insert -- 24, --, therefor.

In Column 13, Line 32, delete "α×n$_{PRB}$" and insert -- α×n$_{PRB.}$ --, therefor.

In Column 14, Line 37, delete "Qm" and insert -- Q$_m$ --, therefor.

In Column 14, Line 38, delete "I_MCS" and insert -- I$_{MCS}$ --, therefor.

In Column 14, Line 40, delete "Qm'" and insert -- Q$_m$' --, therefor.

In Column 14, Line 40, delete "(Qm," and insert -- (Q$_m$, --, therefor.

In Column 14, Line 64, delete "MCSO" and insert -- MCS0 --, therefor.

In Column 16, in Table, Lines 2-3, delete "Modulation Order" and insert -- Modulation Order Q$_m$ --, therefor.

In Column 16, Line 58, delete "RVO" and insert -- RV0 --, therefor.

In Column 19, Line 13, delete "NodeB's." and insert -- NodeBs. --, therefor.

In Column 19, Line 64, delete "units" and insert -- units. --, therefor.

In Column 20, Line 7, delete "manner" and insert -- manner. --, therefor.

In Column 20, Line 16, delete "computer readable" and insert -- computer-readable --, therefor.

In Column 20, Line 19, delete "random access" and insert -- random-access --, therefor.

In Column 21, Line 10, delete "circuitry 190" and insert -- circuitry 192 --, therefor.

In Column 22, Line 26, delete "(CPE)." and insert -- (CPE), --, therefor.

In Column 23, Line 13, delete "circuitry 114" and insert -- circuitry 112 --, therefor.

In Column 24, Line 14, delete "manner" and insert -- manner. --, therefor.

In Column 24, Line 40, delete "Random Access" and insert -- Random-Access --, therefor.

CERTIFICATE OF CORRECTION (continued)
U.S. Pat. No. 11,497,035 B2

In Column 24, Lines 44-45, delete "computer executable" and insert -- computer-executable --, therefor.

In Column 25, Line 58, delete "UE 2200" and insert -- UE 200 --, therefor.

In Column 25, Line 67, delete "interchangeable." and insert -- interchangeably. --, therefor.

In Column 26, Line 6, delete "random access" and insert -- random-access --, therefor.

In Column 26, Line 9, delete "source 233," and insert -- source 213, --, therefor.

In Column 27, Line 33, delete "data file 227." and insert -- data 227. --, therefor.

In Column 27, Line 44, delete "random access" and insert -- random-access --, therefor.

In Column 32, Line 39, delete "which it may" and insert -- which may --, therefor.

In Column 33, Lines 13-14, delete "implemented in that software 511 and 531 causes" and insert -- implemented in softwares 511 and 531 that causes --, therefor.

In Column 34, Line 53, delete "according" and insert -- according to --, therefor.

In Column 35, Line 57, delete "according" and insert -- according to --, therefor.

In Column 36, Line 22, delete "computer readable" and insert -- computer-readable --, therefor.

In Column 36, Line 38, delete "one bits" and insert -- one bit --, therefor.

In Column 36, Line 52, delete "channel" and insert -- channel. --, therefor.

In Column 37, Line 32, delete "having" and insert -- to have --, therefor.

In Column 37, Lines 34-35, delete "channel" and insert -- channel. --, therefor.

In Column 38, Line 7, delete "1600" and insert -- method 1600 --, therefor.

In Column 38, Line 52, delete "(u)," and insert -- (υ), --, therefor.

In Column 38, Line 54, delete "determine to" and insert -- determine --, therefor.

In Column 39, Line 2-5, delete "if the. . . . . . . . . . .CS-RNTI" and insert the same at Line 3, as a new paragraph.

In Column 39, Line 33, delete "Imo'" and insert -- $I_{MCS}$ --, therefor.

In Column 39, Line 37, delete "Imo'" and insert -- $I_{MCS}$ --, therefor.

CERTIFICATE OF CORRECTION (continued)
U.S. Pat. No. 11,497,035 B2

In Column 42, Line 14, delete "find" and insert -- to find --, therefor.

In Column 43, in Table 5.1.3.2-2-continued, Line 1, delete "$N_{info}$" and insert -- $N_{info}$ --, therefor.

In Column 43, Line 54, delete "24" and insert -- 24, --, therefor.

In Column 44, Line 6, delete "using0" and insert -- using 0 --, therefor.

In the Claims

In Column 45, Line 48, in Claim 1, delete "order and" and insert -- order and $\upsilon$ --, therefor.

In Column 46, Line 3, in Claim 3, delete "Random-Access" and insert -- Random Access --, therefor.

In Column 46, Lines 3-4, in Claim 3, delete "Radio Temporary Network Identifier" and insert -- Radio Network Temporary Identifier --, therefor.

In Column 46, Line 56, in Claim 8, delete "$N_{RF}$" and insert -- $N_{RE}$ --, therefor.

In Column 46, Line 58, in Claim 8, delete "and u" and insert -- and $\upsilon$ --, therefor.

In Column 48, Line 20, in Claim 15, delete "$N_{RF}$" and insert -- $N_{RE}$ --, therefor.

In Column 48, Line 31, in Claim 15, delete "TB S" and insert -- TBS --, therefor.